United States Patent
Ravella et al.

(10) Patent No.: US 12,469,394 B2
(45) Date of Patent: Nov. 11, 2025

(54) CENTRALIZED PREDICTION AND PLANNING FOR IMPROVING LANE PLATOONING AND INTERSECTION VEHICLE BEHAVIOR

(71) Applicant: PlusAI, Inc., Santa Clara, CA (US)

(72) Inventors: Siva Bhargav Ravella, San Jose, CA (US); Amit Kumar, Sunnyvale, CA (US); Qiqiang Hou, San Jose, CA (US)

(73) Assignee: PlusAI, Inc., Santa Clara, CA (US)

( * ) Notice: Subject to any disclaimer, the term of this patent is extended or adjusted under 35 U.S.C. 154(b) by 0 days.

(21) Appl. No.: 18/912,576

(22) Filed: Oct. 10, 2024

(65) Prior Publication Data

US 2025/0124794 A1    Apr. 17, 2025

Related U.S. Application Data

(60) Provisional application No. 63/636,090, filed on Apr. 18, 2024, provisional application No. 63/544,425, filed on Oct. 16, 2023.

(51) Int. Cl.
*G08G 1/01* (2006.01)
*B60W 30/02* (2012.01)
(Continued)

(52) U.S. Cl.
CPC ............ *G08G 1/22* (2013.01); *B60W 30/02* (2013.01); *B60W 30/16* (2013.01); *B60W 30/18159* (2020.02); *B60W 40/068* (2013.01); *B60W 50/0097* (2013.01); *B60W 60/001* (2020.02); *B60W 60/0015* (2020.02); *B60W 60/0027* (2020.02); *B62D 15/0265* (2013.01);
(Continued)

(58) Field of Classification Search
CPC ..... G08G 1/22; G08G 1/20; B60W 30/18159; B60W 50/0097; B60W 2556/45
See application file for complete search history.

(56) References Cited

U.S. PATENT DOCUMENTS

| | | | |
|---|---|---|---|
| 11,565,699 B1 | 1/2023 | Ravella | |
| 11,648,946 B2 * | 5/2023 | Li | B60W 30/18163 |
| | | | 701/41 |

(Continued)

OTHER PUBLICATIONS

Ravella, Office Action, U.S. Appl. No. 18/912,574, Dec. 18, 2024, 13 pgs.

(Continued)

*Primary Examiner* — Peter D Nolan
*Assistant Examiner* — Wae L Louie
(74) *Attorney, Agent, or Firm* — Morgan, Lewis & Bockius LLP

(57) ABSTRACT

This application is directed to a centralized system for predicting vehicle trajectory. A computer system associated with a fixed installation having one or more first sensors obtains, from the first sensors, information of a plurality of vehicles that are traveling within a zone of interest of a road. The computer system generates a first travel trajectory for a first vehicle of the plurality of vehicles based on the information obtained from the one or more first sensors. The computer system sends, to the first vehicle, the first travel trajectory such that the first vehicle is configured to at least partially autonomously drive the first vehicle based on the first travel trajectory of the first vehicle.

20 Claims, 18 Drawing Sheets

(51) Int. Cl.
  *B60W 30/16*   (2020.01)
  *B60W 30/18*   (2012.01)
  *B60W 40/068*  (2012.01)
  *B60W 50/00*   (2006.01)
  *B60W 60/00*   (2020.01)
  *B62D 15/02*   (2006.01)
  *G05D 1/43*    (2024.01)
  *G07C 5/00*    (2006.01)
  *G08G 1/00*    (2006.01)
  *G08G 1/052*   (2006.01)
  *G08G 1/0967*  (2006.01)
  *G08G 1/16*    (2006.01)

(52) U.S. Cl.
  CPC .............. *G05D 1/43* (2024.01); *G07C 5/008* (2013.01); *G08G 1/0129* (2013.01); *G08G 1/0141* (2013.01); *G08G 1/052* (2013.01); *G08G 1/096725* (2013.01); *G08G 1/096766* (2013.01); *G08G 1/164* (2013.01); *G08G 1/20* (2013.01); *B60W 2420/403* (2013.01); *B60W 2420/408* (2024.01); *B60W 2420/54* (2013.01); *B60W 2552/00* (2020.02); *B60W 2552/10* (2020.02); *B60W 2552/35* (2020.02); *B60W 2552/40* (2020.02); *B60W 2554/802* (2020.02); *B60W 2554/804* (2020.02); *B60W 2555/20* (2020.02); *B60W 2556/45* (2020.02); *B60W 2556/50* (2020.02); *B60W 2756/10* (2020.02)

(56) References Cited

U.S. PATENT DOCUMENTS

| | | | |
|---|---|---|---|
| 11,654,938 B1 | 5/2023 | Kumar | |
| 11,827,245 B2* | 11/2023 | Wang | B60W 30/18154 |
| 11,919,514 B1 | 3/2024 | Ravella | |
| 12,084,085 B1* | 9/2024 | Bagnell | B60W 40/09 |
| 2008/0167821 A1* | 7/2008 | Breed | G08G 1/161 |
| | | | 701/301 |
| 2008/0215231 A1* | 9/2008 | Breed | G08G 1/161 |
| | | | 382/104 |
| 2017/0369055 A1 | 12/2017 | Saigusa | |
| 2019/0019413 A1 | 1/2019 | Yun | |
| 2019/0064801 A1 | 2/2019 | Frazzoli | |
| 2020/0064846 A1 | 2/2020 | Chen | |
| 2020/0239031 A1* | 7/2020 | Ran | G08G 1/0125 |
| 2020/0272159 A1* | 8/2020 | Zhang | G08G 1/22 |
| 2020/0290638 A1 | 9/2020 | Dam Njanovic | |
| 2021/0065547 A1 | 3/2021 | Ran | |
| 2021/0280057 A1* | 9/2021 | Uçar | G08G 1/096741 |
| 2022/0063621 A1* | 3/2022 | Austin | G06V 20/584 |
| 2022/0068122 A1* | 3/2022 | Ucar | H04W 4/46 |
| 2022/0108618 A1* | 4/2022 | Kumar | G08G 1/22 |
| 2022/0126878 A1 | 4/2022 | Moustafa | |
| 2022/0161823 A1 | 5/2022 | Domeyer | |
| 2022/0242415 A1 | 8/2022 | Nice | |
| 2022/0363291 A1 | 11/2022 | Iwamoto | |
| 2023/0131659 A1 | 4/2023 | Banach | |
| 2023/0154336 A1* | 5/2023 | Cho | B60W 30/165 |
| | | | 701/24 |
| 2023/0202478 A1* | 6/2023 | Fukumoto | B60W 30/165 |
| 2024/0124060 A1 | 4/2024 | Giordano | |
| 2024/0160219 A1* | 5/2024 | Hwang | G05D 1/0295 |
| 2024/0274015 A1* | 8/2024 | Putney | G08G 1/22 |
| 2024/0317255 A1* | 9/2024 | Mocherla | B60W 60/001 |
| 2024/0321110 A1* | 9/2024 | O'Donnell | G08G 1/22 |
| 2024/0351616 A1* | 10/2024 | Ran | G08G 1/0145 |
| 2024/0359739 A1 | 10/2024 | Kumar | |
| 2024/0410707 A1* | 12/2024 | Konrardy | G01C 21/3438 |
| 2025/0124794 A1* | 4/2025 | Ravella | B60W 40/068 |

OTHER PUBLICATIONS

Ravella, Notice of Allowance, U.S. Appl. No. 18/912,574, Apr. 30, 2025, 10 pgs.

* cited by examiner

800 ⟶

Intersection Info
- Type 802 (signaled / priority level)
- Location 804 (e.g., center of the intersection)
- Status 806 (e.g., clear / not clear)
- Each lane 808:
  - ID 810 (e.g., first digit: direction; second digit: lane number
  - Lane signal 812 (e.g., red/amber/green/stop/go)
  - Lane clear 814 (e.g., yes/no)
  - Vehicles in lane 816:
    - Vehicle ID 818
    - Location (x,y) 819
    - Mode (e.g., stop/creep/fast-go) 820
    - Time of entering current mode 822
    - Vehicle type 824 (e.g., ambulance / fire truck / police car / other)
    - Speed 826
    - Acceleration 828

At a computer system that is associated with a fixed installation at a road. The fixed installation includes one or more sensors first sensors. The computer system includes one or more processors and memory

---

1202 Obtain, from the one or more first sensors, information of a plurality of vehicles that are traveling within a zone of interest of a road > 1204 The information of the plurality of vehicles includes location information of a respective vehicle of the plurality of vehicles > 1206 The information of the plurality of vehicles includes a speed of the respective vehicle > 1208 The information of the plurality of vehicles includes an acceleration of the respective vehicle > 1210 The one or more first sensors include: one or more light detection and ranging (LiDAR) scanners, one or more cameras, or a radio detection and ranging (RADAR) sensor > 1212 The zone of interest of the road comprises an intersection of the road > 1214 The zone of interest comprises a merging zone on the road

---

> 1216 Receive vehicle status information from at least a subset of the plurality of vehicles that are traveling within the zone of interest

1248 Send, to the first vehicle, the first travel trajectory such that the first vehicle is configured to at least partially autonomously drive the first vehicle based on the first travel trajectory of the first vehicle > 1250 Send, to the first vehicle, the bird's eye view of the zone of interest. The first vehicle is configured to apply the first travel trajectory in combination with the bird's eye view of the zone of interest > 1252 Send, to the first vehicle, the perception information of the intersection of the road generated by the computer system. The first vehicle is configured to apply the first travel trajectory in combination with the perception information of the intersection of the road > 1254 Send, to the first vehicle, the perception information of the merging zone generated by the computer system. The first vehicle is configured to apply the first travel trajectory in combination with the perception information of the merging zone > 1256 The first vehicle is configured to apply the first travel trajectory in combination with the data acquired by the one or more second sensors > 1258 The first vehicle is configured to abort executing the first travel trajectory in accordance with a determination that the first vehicle cannot execute the first travel trajectory 1260 Control the first vehicle to at least partially autonomously drive the first vehicle to track the first travel trajectory

At a first vehicle traveling along a road. The first vehicle includes at least a first sensor, one or more processors, and memory 1302 Acquire, from the at least the first sensor, first data of one or more first objects in a vicinity of the first vehicle 1304 Receive, from a computer system associated with a fixed installation, via a wireless network, a first travel trajectory for the first vehicle. The first travel trajectory is generated by the computer system based on second data corresponding to one or more second objects sensed on the road by sensors of the fixed installation 1306 The one or more second objects include one or more vehicles that are traveling on the road with the first vehicle 1308 The second data includes one or more of: location information of a respective vehicle of the one or more vehicles; a speed of the respective vehicle; and an acceleration of the respective vehicle 1310 The sensors of the fixed installation include at least one of: a light detection and ranging (LiDAR) scanner, a camera, or a radio detection and ranging (RADAR) sensor.

1312 Receive, from the computer system, a bird's eye view of the road

1332 In accordance with a determination that the first vehicle can track the first travel trajectory, at least partially autonomously drive the first vehicle in the first travel trajectory > 1334 Adjust one or more parameters of a steering control model of the first vehicle

1336 In accordance with a determination that the first vehicle cannot track the first travel trajectory, reject the first travel trajectory and control the first vehicle to at least partially autonomously drive the first vehicle according to a second travel trajectory that is different from the first travel trajectory > 1338 Switch from a first lane of the road to a second lane of the road

Figure 13C

CENTRALIZED PREDICTION AND PLANNING FOR IMPROVING LANE PLATOONING AND INTERSECTION VEHICLE BEHAVIOR

RELATED APPLICATIONS

This application claims priority to (i) U.S. Provisional Application No. 63/544,425, filed Oct. 16, 2023, titled "Motion Controlling for Autonomous Vehicles" and (ii) U.S. Provisional Application No. 63/636,090, filed Apr. 18, 2024, titled "Centralized Prediction and Planning Using V2X for Lane Platooning and Intersection Vehicle Behavior Optimizations and Lane Change Decision-Making by Combining Infrastructure and Vehicle Intelligence," each of which is hereby incorporated by reference herein in its entirety.

This application is related to the following applications, all of which are incorporated by reference herein in their entireties:

U.S. patent application Ser. No. 18/912,574, filed Oct. 10, 2024, titled "Improved Steering Lateral Precision Control Combining Infrastructure and Vehicle Intelligence"; and U.S. patent application Ser. No. 18/912,577, filed Oct. 10, 2024, titled "Improved Motion Tracking for Autonomous Vehicle Driving."

TECHNICAL FIELD

The present application generally relates to vehicle technology, and more particularly to, methods, systems, and non-transitory computer readable storage media for collecting vehicle traffic data that can be used onboard or offboard to improve decision making in autonomous vehicles.

BACKGROUND

Vehicles are now capable of self-driving with different levels of autonomy. Each of these levels is characterized by the relative amount of human and autonomous control. For example, The Society of Automotive Engineers (SAE) defines 6 levels of driving automation ranging from 0 (fully manual) to 5 (fully autonomous). These levels have been adopted by the U.S. Department of Transportation. Autonomous vehicles provide numerous advantages including: (1) lowering the number of vehicles on the roads, (2) more predictable and safer driving behavior than human driven vehicles, (3) less emissions if there are fewer vehicles on the road, and if they are electrically powered, (4) improved travel efficiency, fuel economy, and traffic safety if they are controlled by computers, (5) increased lane capacity, (6) shorter travel times, and (7) increased mobility for users who are incapable of diving.

There are numerous advantages of autonomous vehicles, including: (1) lowering the number of vehicles on the roads (most privately owned vehicles are driven a small fraction of the time); (2) more predictable and safer driving behavior than human driven vehicles; (3) less emissions if more vehicles are electrically powered; (4) improved fuel efficiency; (5) increased lane capacity; (6) shorter travel times; and (7) mobility for users who are incapable of diving.

One of the key obstacles facing the autonomous vehicle industry is the complexity and unpredictability of road and traffic conditions. Currently, autonomous vehicles are equipped with sensors that are primarily used for object (e.g., obstacle) detection. Although large amounts of data have been collected from individual vehicles to learn from existing road and traffic conditions, these data tend to be limited only to the perception of the individual vehicles and do not capture complex interaction with other vehicles at locations such as road intersections and freeway merging areas. It would be beneficial to have a mechanism to capture information about these zones of interest in an efficient manner.

SUMMARY

Some embodiments of the present disclosure are directed to methods, systems, and non-transitory computer readable storage media for collecting vehicle traffic data to facilitate the determination of a vehicle trajectory for autonomous vehicle driving.

In accordance with some embodiments of this application is a realization that sensors positioned on installations (e.g., an infrastructure system) that are situated along a zone of interest of a road can provide supplemental information to autonomous vehicles, in addition to data collected by onboard vehicle sensors. Exemplary zones of interest can include an intersection of a road, a merging zone on a road, or a toll booth. In some embodiments, an installation is configured to gather traffic information about its zone of interest using sensors installed on the installation. In some embodiments, the installation is configured to gather, via one or more processors of the installation, information from vehicles traveling through the zone of interest via wireless internet communication, such as 5G communication. In some embodiments, the one or more processors of the installation are configured to generate scene perception and prediction information, as well as vehicle path planning suggestions, and provide them to vehicles in the zone of interest via wireless internet communication.

In accordance with some embodiments of the present disclosure is a realization that although traditional autonomous vehicle systems are configured to detect circumstances using sensors, these sensors tend to be positioned onboard the autonomous vehicles and are limited to the perspective of the vehicles. For example, the onboard sensors may have short look-ahead distances and are unable to accurately estimate overall traffic flow (e.g., average speeds, accelerations, and distances of vehicles traveling in the vicinity). Because autonomous vehicles rely on data collected by the onboard sensors to make planning and control decisions, the limited perspective offered by these sensors tend to hinder the performance of the autonomous vehicles in situations where the travel trajectories require detection ranges beyond those provided by the onboard sensors, such as in uphill or downhill paths, or on routes that include sharp curves.

One of the decisions that an autonomous vehicle system has to make while traveling is whether or not to switch lanes. In some instances, an autonomous vehicle makes its lane change decision based on the statuses of other vehicles that are situated in front or behind the vehicle. In some circumstances, in order to plan a travel route that provides better comfort and fuel economy, an autonomous vehicle may also consider traffic scenarios at a further distance horizon, such as a mile or two miles away from a current location of the vehicle. The sensors onboard the vehicles do not have the sensing range to capture data from these longer distances. Some embodiments of the present disclosure address the deficiencies of onboard vehicle sensors by implementing installations (e.g., road fixtures) that includes sensors positioned on the installations. Compared to onboard vehicle sensors, the sensors on the installations tend to have fixed, longer, and wider fields of views and are thus equipped to provide supplemental information to an autonomous vehicle. In some embodiments, the installation and the autonomous vehicles can communicate via wireless cellular or internet communications with minimal delays.

Some embodiments of the present disclosure are directed to methods, systems, and non-transitory computer readable storage media for controlling vehicle trajectory for autonomous vehicle driving. In accordance with some embodiments of this application is a realization that sensors, such as cameras, that are positioned on an installation can capture traffic information within a sensing range of the installation at an aerial (e.g., bird's eye view) perspective. In some embodiments, compared to data collected by individual vehicles using vehicle sensors, the traffic information collected by the sensors disposed at the fixed installation tend to be more detailed and relevant to the installation. The sensors disposed at the fixed installation may be statically (e.g., fixedly or immovably) positioned at the fixed installation, thereby providing a stable and accurate detection coverage on the road and traffic conditions of a fixed area of a road associated with the fixed installation. By contrast, vehicle-centric autonomous systems suffer from limited viewpoints, as well as lack of consistent and repeatable data in zones of interests such as those described above, given that their primary operation domains are usually not these zones. In some embodiments, the installation includes one or more processors that are configured to transmit runtime information of vehicles within the sensing range of the installation, as well as other information such as road incidents, to an autonomous vehicle as the autonomous vehicle travels in a vicinity of the installation. In some embodiments, the one or more processors of the installations are configured to determine (e.g., generate) a travel trajectory for an autonomous vehicle according to the traffic information, where the autonomous vehicle is configured to at least partially autonomously drive the first vehicle in the travel trajectory.

In one aspect, a method for predicting vehicle trajectory is implemented at a computer system associated with a fixed installation. The fixed installation includes one or more first sensors. In some embodiments, the one or more first sensors include a light detection and ranging (LiDAR) scanner, a camera, or a radio detection and ranging (RADAR) sensor. The computer system includes one or more processors and memory. The method includes obtaining, from the one or more first sensors, information of a plurality of vehicles that are traveling within a zone of interest of a road. In some embodiments, the information of the plurality of vehicles include location information of a respective vehicle of the plurality of vehicles, a speed of the respective vehicle, or an acceleration of the respective vehicle. The method includes generating a first travel trajectory for a first vehicle of the plurality of vehicles based on the information obtained from the one or more first sensors. The method includes sending, to the first vehicle, the first travel trajectory such that the first vehicle is configured to at least partially autonomously drive the first vehicle based on the first travel trajectory of the first vehicle.

In some embodiments, the method includes predicting a vehicle action of a respective vehicle of the plurality of vehicles according to the obtained information. In some embodiments, predicting the vehicle action includes predicting a probability of the respective vehicle changing lanes while traveling on the road or predicting a probability of the respective vehicle changing lanes while traveling on the road. In some embodiments, generating the first travel trajectory for the first vehicle is further based on the predicted vehicle action.

In some embodiments, the method includes determining, according to the data of the plurality of vehicles, a distance between the first vehicle and the second vehicle. Transmitting the second vehicle data to the first vehicle further includes transmitting information about the distance between the first vehicle and the second vehicle.

In some embodiments, the method includes receiving vehicle status information from at least a subset of the plurality of vehicles that are traveling within the zone of interest. In some embodiments, generating the first travel trajectory for the first vehicle is further based on the received vehicle status information.

In some embodiments, the method includes generating a bird's eye view of the zone of interest. In some embodiments, the bird's eye view is generated by applying a perception model. In some embodiments, the method includes sending the bird's eye view of the zone of interest to the first vehicle, and causing the first vehicle to apply the first travel trajectory in combination with the bird's eye view of the zone of interest.

According to another aspect of the present application, a computer system is associated with a fixed installation at a road. The fixed installation includes one or first more sensors that are positioned on a fixed installation. The computer system includes one or more processors, and memory coupled to the one or more processors. The memory stores instructions that, when executed by the one or more processors, cause the computer system to perform any of the methods for predicting vehicle trajectory as disclosed herein.

According to another aspect of the present application, a non-transitory computer readable storage medium stores instructions configured for execution by a computer system that includes one or first more sensors that are positioned on a fixed installation, one or more processors, and memory. The instructions, when executed by the one or more processors, cause the computer system to perform any of the methods for predicting vehicle trajectory as disclosed herein.

According to another aspect of the present application, a method for controlling a vehicle trajectory is implemented at a first vehicle (e.g., an ego vehicle) traveling along a road. The first vehicle includes at least a first sensor, one or more processors, and memory. The method includes acquiring, from the at least the first sensor, first data of one or more first objects in a vicinity of the first vehicle. The method includes receiving, from a computer system associated with a fixed installation, via a wireless network (e.g., a 5G network), a first travel trajectory for the first vehicle. The first travel trajectory is generated by the computer system based on second data corresponding to one or more second objects sensed on the road by sensors of the fixed installation. In some embodiments, the one or more second objects include one or more vehicles. The method includes determining (by the first vehicle), according to the first data and the first travel trajectory, whether the first vehicle can track (e.g., follow) the first travel trajectory. The method includes, in accordance with a determination (by the first vehicle) that the first vehicle can track the first travel trajectory, at least partially autonomously drive the first vehicle in the first travel trajectory.

In some embodiments, determining whether the first vehicle can track the first travel trajectory includes applying a cost function to determine an aggregate cost of tracking the first travel trajectory. In some embodiments, the cost function includes a first term associated with safety, a second term associated with performing a lane change, a third term associated with fuel economy, or a fourth term associated with maintaining an accuracy of steering control.

In some embodiments, at least partially autonomously drive the first vehicle in the first travel trajectory includes adjusting one or more parameters of a steering control model of the first vehicle. In some embodiments, the steering control model of the first vehicle is configured to operate in a tracking-based mode and a stability-based mode. In some embodiments, in the tracking-based mode, the first vehicle is configured to maintain the lateral offset to be as close to zero as possible, meaning that the first vehicle would drive/stay in the middle of its lane to keep its distance from other vehicles in neighboring lanes. In some embodiments, in the stability-based mode, the steering control model permits the first vehicle to deviate from the middle of its lane (e.g., assuming that other factors such as safety and obstacle detection are met) if departing from the middle of the lane enables a smoother ride to be achieved.

In some embodiments, the method includes, in accordance with a determination that the first vehicle cannot track the first travel trajectory: (i) rejecting the first travel trajectory; and (ii) controlling the first vehicle to at least partially autonomously drive the first vehicle according to a second travel trajectory that is different from the first travel trajectory. In some embodiments, at least partially autonomously driving the first vehicle according to the second travel trajectory includes switching from a first lane of the road to a second lane of the road.

According to another aspect of the present application, a first vehicle includes at least a first sensor, one or more processors, and memory coupled to the one or more processors. The memory stores instructions that, when executed by the one or more processors, cause the first vehicle to perform any of the methods for controlling a vehicle trajectory as disclosed herein.

According to another aspect of the present application, a non-transitory computer readable storage medium stores instructions configured for execution by a first vehicle that includes at least a first sensor, one or more processors, and memory. The instructions, when executed by the one or more processors, cause the first vehicle to perform any of the methods for controlling a vehicle trajectory as disclosed herein. Accordingly, the systems and/or methods disclosed herein advantageously improve decision making modules in autonomous vehicles by providing additional traffic information that is beyond a sensing range of the vehicle sensors. For example, in some embodiments, the sensors mounted on road installations can be used to provide an accurate view of obstacles (e.g., vehicles and non-vehicles), and their locations, which may not be in direct sight of an ego vehicle. The additional traffic information can be used to generate vehicle path trajectories and cause the ego vehicle to at least partially autonomously drive the ego vehicle according to a suggested trajectory.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

BRIEF DESCRIPTION OF THE DRAWINGS

The accompanying drawings, which are included to provide a further understanding of the embodiments, are incorporated herein, constitute a part of the specification, illustrate the described embodiments, and, together with the description, serve to explain the underlying principles.

FIG. 8 illustrates exemplary information collected by an installation at an intersection, in accordance with some embodiments.

FIGS. 12A to 12D provide a flowchart of an example process for predicting vehicle trajectory, in accordance with some embodiments.

FIGS. 13A to 13C provide a flowchart of an example process for controlling a vehicle trajectory, in accordance with some embodiments.

Like reference numerals refer to corresponding parts throughout the several views of the drawings.

DETAILED DESCRIPTION

Figure 1:
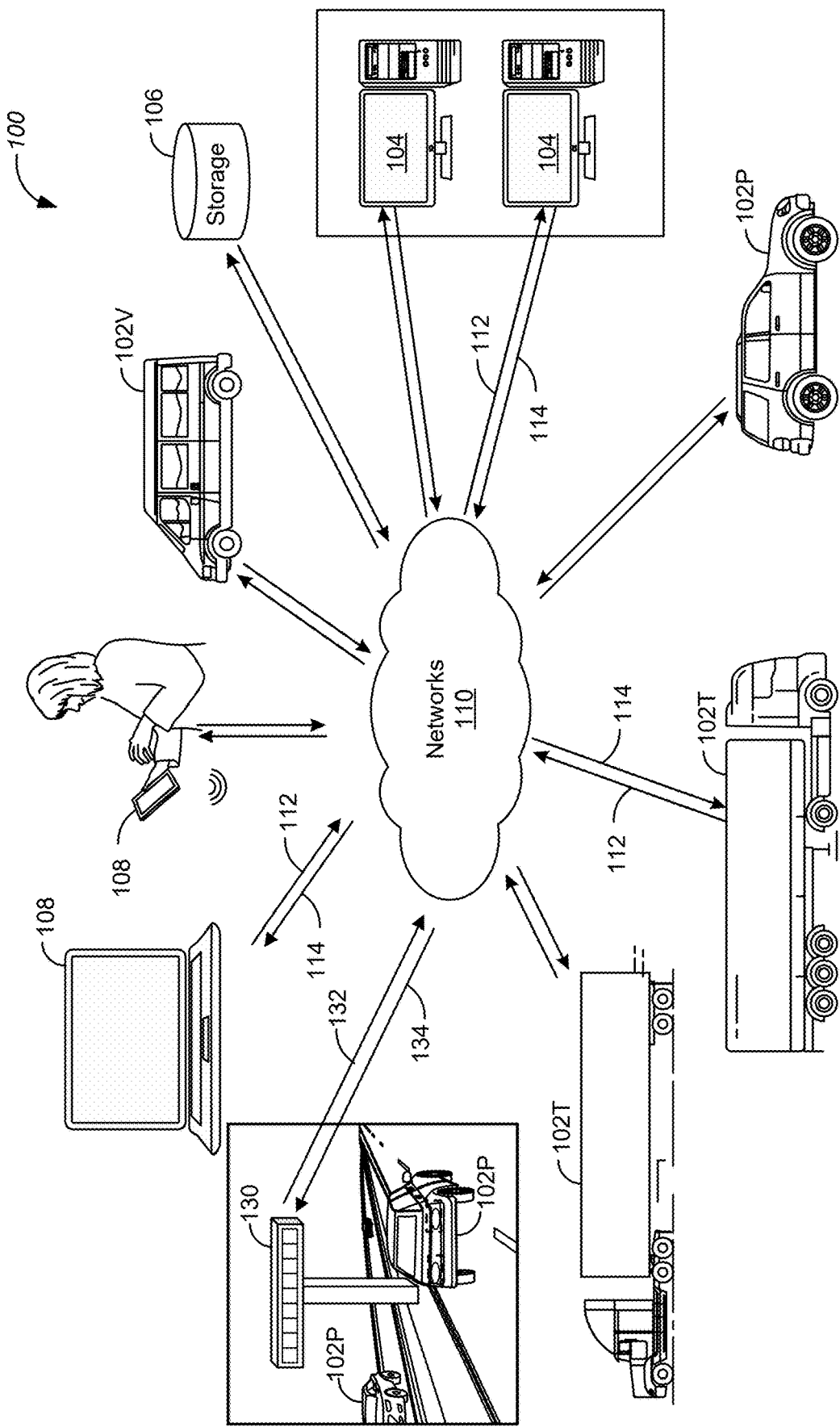
FIG. 1 is an example vehicle driving environment for a plurality of vehicles, in accordance with some embodiments.

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of the claims and the subject matter may be practiced without these specific details. For example, it will be apparent to one of ordinary skill in the art that the subject matter presented herein can be implemented on many types of electronic devices with digital video capabilities.

Various embodiments of this application are directed to collecting traffic information from vehicles within a zone of interest of a road. The traffic information can be used in onboard decision making by autonomous vehicles for planning vehicle trajectory. In some embodiments, a computer system includes one or more first sensors that are positioned on a fixed installation (e.g., an infrastructure) at a road. The computer system includes one or more processors, and memory. In some embodiments, the computer system (e.g., a microcontroller unit) is physically co-located at the fixed installation. In some embodiments, the computer system includes one or more distinct systems located at distinct locations of the road. For example, multiple installations, each having respective sensors, may be positioned along a stretch of a road (e.g., at intervals of every one kilometer, three kilometers, or five kilometers). The one or more first sensors can include one or more cameras, one or more microphones, one or more inductive loop detectors, a global positioning system (GPS), a thermal sensor (e.g., temperature sensor), a light detection and ranging (LiDAR) scanner, a radio detection and ranging (RADAR) sensor, an infrared sensor, and one or more ultrasonic sensors.

The computer system obtains, from the one or more first sensors (e.g., every 0.1 sec, 1 sec, 2 sec), information of a plurality of vehicles that are traveling within a zone of interest of a road. In some embodiments, the information of the plurality of vehicles includes location information (e.g., (x,y) coordinates) of a respective vehicle of the plurality of vehicles, a speed (e.g., average speed) of the respective vehicle, or an acceleration (e.g., average acceleration) of the respective vehicle The zone of interest is an area on a road that is within a detection range of the one or more first sensors. For example, in some embodiments, the zone of interest is a segment of a road where traffic may be prone to buildup, such as a freeway entrance or exit, a lane merge zone (e.g., on a section of a road where two or more lanes merge), a tunnel, a toll booth, a traffic light area, or an on-ramp region of a highway. In some embodiments, a zone of interest is a segment of a blind that is prone to traffic blind spots, such as a traffic junction or an intersection where two or more roads converge, diverge, meet or cross. The computer system generates a first travel trajectory for a first vehicle (e.g., an ego vehicle) of the plurality of vehicles based on at least the information obtained from the one or more first sensors. The computer system sends, to the first vehicle, the first travel trajectory such that the first vehicle is configured to at least partially autonomously drive the first vehicle based on the first travel trajectory of the first vehicle. In some embodiments, the first vehicle includes one or more second sensors for acquiring data in a vicinity of the first vehicle. The first vehicle is configured to apply the first travel trajectory in combination with the data acquired by the one or more second sensors. In some embodiments, the computer device controls (e.g., commands or causes) the first vehicle to at least partially autonomously drive the first vehicle to track the first travel trajectory. In some embodiments, the first vehicle is configured to abort executing the first travel trajectory in accordance with a determination that the first vehicle cannot execute the first travel trajectory.

In some embodiments, the computer system predicts (e.g., determines) a vehicle action of a respective vehicle of the plurality of vehicles according to the obtained information. In some embodiments, predicting the vehicle action includes predicting a probability of the respective vehicle changing lanes while traveling on the road or a probability of the respective vehicle changing lanes while traveling on the road. In some embodiments, generating the first travel trajectory for the first vehicle is further based on the predicted vehicle action.

In some embodiments, the computer system receives vehicle status information from at least a subset of (e.g., one or more of) the plurality of vehicles that are traveling within the zone of interest. In some embodiments, the computer system receives the vehicle status information via wireless communication, such as 5G communication). In some embodiments, the generating the first travel trajectory for the first vehicle is further based on the received vehicle status information.

In some embodiments, the computer system generates a bird's eye view of the zone of interest. In some embodiments, the computer system applies a data-driven perception model to generate the bird's eye view of the zone of interest. In some embodiments, the perception model executes locally at the fixed installation. In some embodiments, the perception model executes on a cloud (e.g., on a server system distinct from the computer system). In some embodiments, the generating the first travel trajectory for the first vehicle is further based on the bird's eye view of the zone of interest. In some embodiments, the computer system sends, to the first vehicle, the bird's eye view of the zone of interest. The first vehicle is configured to apply the first travel trajectory in combination with the bird's eye view of the zone of interest.

Various embodiments of this application are directed to a road installation that includes sensors for collecting traffic information from vehicles that are traveling on a road. In some embodiments, the road installation includes one or processors that send the runtime information of moving vehicles as well as other traffic information (e.g., presence of accidents) to an autonomous vehicle that is traveling on the road. The traffic information can be used in onboard decision making by the autonomous vehicle for lane changing decisions.

In some embodiments, a first vehicle (e.g., an ego vehicle) is traveling along a road. The first vehicle includes at least a first sensor, one or more processors, and memory. The first vehicle acquires, from the at least the first sensor, first data of one or more first objects in a vicinity of the first vehicle. The first vehicle receives, from a computer system associated with a fixed installation, via a wireless network (e.g., 5G network), a first travel trajectory for the first vehicle. The first travel trajectory is generated by the computer system based on second data corresponding to one or more second objects sensed on the road by sensors of the fixed installation. In some embodiments, the one or more second objects include one or more vehicles that are traveling on the road with the first vehicle. In some embodiments, the second data includes location information (e.g., (x,y) coordinates) of a respective vehicle of the one or more vehicles, a speed (e.g., average speed) of the respective vehicle, or an acceleration (e.g., an average acceleration) of the respective vehicle.

The first vehicle determines, according to the first data and the first travel trajectory, whether the first vehicle can track (e.g., follow) the first travel trajectory generated by the computer system. In some embodiments, the first vehicle determines whether it can track the first travel trajectory by applying a cost function to determine an aggregate cost (e.g., a value) of tracking the first travel trajectory. In some embodiments, the cost function can include a first term associated with safety, a second term associated with performing a lane change, a third term associated with fuel economy, or a fourth term associated with maintaining an accuracy of steering control. The first vehicle, in accordance with a determination that the first vehicle can track the first travel trajectory, at least partially autonomously drives the first vehicle in the first travel trajectory. In some embodiments, the first vehicle at least partially autonomously drives the first vehicle in the first travel trajectory by adjusting one or more parameters of a steering control model of the first vehicle.

In some embodiments, the first vehicle, in accordance with a determination that the first vehicle cannot track the first travel trajectory, rejects the first travel trajectory and controls the first vehicle to at least partially autonomously drive the first vehicle according to a second travel trajectory that is different from the first travel trajectory. In some embodiments, the first vehicle at least partially autonomously drives the first vehicle according to the second travel trajectory by switching from a first lane of the road to a second lane of the road.

FIG. 1 is an example vehicle driving environment 100 having a plurality of vehicles 102 (e.g., vehicles 102P, 102T, and 102V), in accordance with some embodiments. Each vehicle 102 has one or more processors, memory, a plurality of sensors, and a vehicle control system. The vehicle control system is configured to sense the vehicle driving environment 100 and drive on roads having different road conditions. The plurality of vehicles 102 may include passenger cars 102P (e.g., sport-utility vehicles and sedans), vans 102V, trucks 102T, and driver-less cars. Each vehicle 102 can collect sensor data and/or user inputs, execute user applications, present outputs on its user interface, and/or operate the vehicle control system to drive the vehicle 102. The collected data or user inputs can be processed locally (e.g., for training and/or for prediction) at the vehicle 102 and/or remotely by one or more servers 104. The one or more servers 104 provide system data (e.g., boot files, operating system images, and user applications) to the vehicle 102, and in some embodiments, process the data and user inputs received from the vehicle 102 when the user applications are executed on the vehicle 102. In some embodiments, the vehicle driving environment 100 further includes storage 106 for storing data related to the vehicles 102, servers 104, and applications executed on the vehicles 102.

For each vehicle 102, the plurality of sensors includes one or more of: (1) a global positioning system (GPS) sensors; (2) a light detection and ranging (LiDAR) scanner; (3) one or more cameras; (4) a radio detection and ranging (RADAR) sensor; (5) an infrared sensor; (6) one or more ultrasonic sensors; (7) a dedicated short-range communication (DSRC) module; (8) an inertial navigation system (INS) including accelerometers and gyroscopes; (9) an inertial measurement unit (IMU) for measuring and reporting acceleration, orientation, angular rates, and other gravitational forces; and/or (10) an odometry sensor. In some embodiments, a vehicle 102 includes a 5G communication module to facilitate vehicle communication jointly with or in place of the DSRC module. The cameras are configured to capture a plurality of images in the vehicle driving environment 100, and the plurality of images are applied to map the vehicle driving environment 100 to a 3D vehicle space and identify a location of the vehicle 102 within the environment 100. The cameras also operate with one or more other sensors (e.g., GPS, LiDAR, RADAR, and/or INS) to localize the vehicle 102 in the 3D vehicle space. For example, the GPS identifies a geographical position (geolocation) of the vehicle 102 on the Earth, and the INS measures relative vehicle speeds and accelerations between the vehicle 102 and adjacent vehicles 102. The LiDAR scanner measures the distance between the vehicle 102 and adjacent vehicles 102 and other objects. Data collected by these sensors is used to determine vehicle locations determined from the plurality of images or to facilitate determining vehicle locations between two images.

The vehicle control system includes a plurality of actuators for at least steering, braking, controlling the throttle (e.g., accelerating, maintaining a constant velocity, or decelerating), and transmission control. Depending on the level of automation, each of the plurality of actuators (or manually controlling the vehicle, such as by turning the steering wheel) can be controlled manually by a driver of the vehicle, automatically by the one or more processors of the vehicle, or jointly by the driver and the processors. When the vehicle 102 controls the plurality of actuators independently or jointly with the driver, the vehicle 102 obtains the sensor data collected by the plurality of sensors, identifies adjacent road features in the vehicle driving environment 100, tracks the motion of the vehicle, tracks the relative distance between the vehicle and any surrounding vehicles or other objects, and generates vehicle control instructions to at least partially autonomously control driving of the vehicle 102. Conversely, in some embodiments, when the driver takes control of the vehicle, the driver manually provides vehicle control instructions via a steering wheel, a braking pedal, a throttle pedal, and/or a gear lever directly. In some embodiments, a vehicle user application is executed on the vehicle and configured to provide a user interface. The driver provides vehicle control instructions to control the plurality of actuators of the vehicle control system via the user interface of the vehicle user application. By these means, the vehicle 102 is configured to drive with its own vehicle control system and/or the driver of the vehicle 102 according to the level of autonomy.

In some embodiments, autonomous vehicles include, for example, a fully autonomous vehicle, a partially autonomous vehicle, a vehicle with driver assistance, or an autonomous capable vehicle. Capabilities of autonomous vehicles can be associated with a classification system, or taxonomy, having tiered levels of autonomy. A classification system can be specified, for example, by industry standards or governmental guidelines. For example, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention) as classified by the International Society of Automotive Engineers (SAE International). Following this example, an autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode. As used herein, the term "driver" may refer to a local operator or a remote operator. The autonomous vehicle may operate solely at a given level (e.g., level 2 additional assistance or level 5 full automation) for at least a period of time or during the entire operating time of the autonomous vehicle. Other classification systems can provide other levels of autonomy characterized by different vehicle capabilities.

In some embodiments, the vehicle 102 drives in the vehicle driving environment 100 at level 5. The vehicle 102 collects sensor data from the plurality of sensors, processes the sensor data to generate vehicle control instructions, and controls the vehicle control system to drive the vehicle autonomously in response to the vehicle control instructions. Alternatively, in some situations, the vehicle 102 drives in the vehicle driving environment 100 at level 0. The vehicle 102 collects the sensor data and processes the sensor data to provide feedback (e.g., a warning or an alert) to a driver of the vehicle 102 to allow the driver to drive the vehicle 102 manually and based on the driver's own judgement. Alternatively, in some situations, the vehicle 102 drives in the vehicle driving environment 100 partially autonomously at one of levels 1-4. The vehicle 102 collects the sensor data and processes the sensor data to generate a vehicle control instruction for a portion of the vehicle control system and/or provide feedback to a driver of the vehicle 102. The vehicle 102 is driven jointly by the vehicle control system of the vehicle 102 and the driver of the vehicle 102. In some embodiments, the vehicle control system and driver of the vehicle 102 control different portions of the vehicle 102. In some embodiments, the vehicle 102 determines the vehicle status. Based on the vehicle status, a vehicle control instruction of one of the vehicle control system or driver of the vehicle 102 preempts or overrides another vehicle control instruction provided by the other one of the vehicle control system or driver of the vehicle 102.

For the vehicle 102, the sensor data collected by the plurality of sensors, the vehicle control instructions applied to the vehicle control system, and the user inputs received via the vehicle user application form a collection of vehicle data 112. In some embodiments, at least a subset of the vehicle data 112 from each vehicle 102 is provided to one or more servers 104. A server 104 provides a central vehicle platform for collecting and analyzing the vehicle data 112, monitoring vehicle operation, detecting faults, providing driving solutions, and updating additional vehicle information 114 to individual vehicles 102 or client devices 108. In some embodiments, the server 104 manages vehicle data 112 of each individual vehicle 102 separately. In some embodiments, the server 104 consolidates vehicle data 112 from multiple vehicles 102 and manages the consolidated vehicle data jointly (e.g., the server 104 statistically aggregates the data).

Additionally, in some embodiments, the vehicle driving environment 100 further includes one or more client devices 108, such as desktop computers, laptop computers, tablet computers, and mobile phones. Each client device 108 is configured to execute a client user application associated with the central vehicle platform provided by the server 104. The client device 108 is logged into a user account on the client user application, and the user account is associated with one or more vehicles 102. The server 104 provides the collected vehicle data 112 and additional vehicle information 114 (e.g., vehicle operation information, fault information, or driving solution information) for the one or more associated vehicles 102 to the client device 108 using the user account of the client user application. In some embodiments, the client device 108 is located in the one or more vehicles 102, while in other embodiments, the client device is at a location distinct from the one or more associated vehicles 102. As such, the server 104 can apply its computational capability to manage the vehicle data 112 and facilitate vehicle monitoring and control on different levels (e.g., for each individual vehicle, for a collection of vehicles, and/or for related client devices 108).

The plurality of vehicles 102, the one or more servers 104, and the one or more client devices 108 are communicatively coupled to each other via one or more communication networks 110, which is used to provide communications links between these vehicles and computers connected together within the vehicle driving environment 100. The one or more communication networks 110 may include connections, such as a wired network, wireless communication links, or fiber optic cables. Examples of the one or more communication networks 110 include local area networks (LAN), wide area networks (WAN) such as the Internet, or a combination thereof. The one or more communication networks 110 are, in some embodiments, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VOIP), Wi-MAX, or any other suitable communication protocol. A connection to the one or more communication networks 110 may be established either directly (e.g., using 3G/4G/5G connectivity to a wireless carrier), or through a network interface (e.g., a router, a switch, a gateway, a hub, or an intelligent, dedicated whole-home control node), or through any combination thereof. In some embodiments, the one or more communication networks 110 allow for communication using any suitable protocols, like Transmission Control Protocol/Internet Protocol (TCP/IP). In some embodiments, each vehicle 102 is communicatively coupled to the servers 104 via a cellular communication network.

In some embodiments, deep learning techniques are applied by the vehicles 102, the servers 104, or both, to process the vehicle data 112. For example, in some embodiments, after image data is collected by the cameras of one of the vehicles 102, the image data is processed using an object detection model to identify objects (e.g., road features including, but not limited to, vehicles, lane lines, shoulder lines, road dividers, traffic lights, traffic signs, road signs, cones, pedestrians, bicycles, and drivers of the vehicles) in the vehicle driving environment 100. In some embodiments, additional sensor data is collected and processed by a vehicle control model to generate a vehicle control instruction for controlling the vehicle control system. In some embodiments, a vehicle planning model is applied to plan a driving control process based on the collected sensor data and the vehicle driving environment 100. The object detection model, vehicle control model, and vehicle planning model are collectively referred to herein as vehicle data processing models (i.e., machine learning models 250 in FIG. 2), each of which includes one or more neural networks. In some embodiments, such a vehicle data processing model is applied by the vehicles 102, the servers 104, or both, to process the vehicle data 112 to infer associated vehicle status and/or provide control signals. In some embodiments, a vehicle data processing model is trained by a server 104, and applied locally or provided to one or more vehicles 102 for inference of the associated vehicle status and/or to provide control signals. Alternatively, a vehicle data processing model is trained locally by a vehicle 102, and applied locally or shared with one or more other vehicles 102 (e.g., by way of the server 104). In some embodiments, a vehicle data processing model is trained in a supervised, semi-supervised, or unsupervised manner.

In some embodiments, the vehicle driving environment 100 further includes one or more installations 130 (e.g., an infrastructure) that are situated along a road. For example, in some embodiments, the installations 130 can positioned at locations along a road where traffic may be prone to buildup, such as a freeway entrance or exit, a lane merge zone (e.g., on a section of a road where two or more lanes merge), a tunnel, a toll booth, a traffic light area, an on-ramp region of a highway, and/or a junction (e.g., an intersection) where two or more roads converge, diverge, meet or cross. In some embodiments, a segment of a road can have multiple installations 130 that are positioned at regular intervals (e.g., every kilometer, every mile, every 2 miles, etc.) along the road. In some embodiments, the installations 130 include fixed, immovable structures. In some embodiments, the installations 130 are positioned ahead of traffic of interest (e.g., the vehicles are driving in a direction toward the installations).

The one or more installations 130, the plurality of vehicles 102, the one or more servers 104, and the one or more client devices 108 are communicatively coupled to each other via the one or more communication networks 110. In some embodiments, a vehicle 102 can be equipped with a vehicle-to-infrastructure (V2I) communication system, in which the vehicle 102 and the one of more installations 130 are communicating nodes that provide each other with information such as traffic information, weather information, road condition information, and safety warnings. In accordance with some embodiments, V2I involves the exchange of information between vehicles 102 and components (e.g., sensors 660, communication module 616, data processing module 626, and other components) of an installation 130. In some embodiments, a respective vehicle 102 can be equipped with a vehicle-to-everything (V2X) communication system, in which the respective vehicle 102 can exchange information with the one of more installations 130 as well as with other vehicles that may be driving along the same road (e.g., route), or a different road, as the respective vehicle 102. The V2I and/or V2X communication system can be powered using 3G/4G/5G connectivity to a wireless carrier, or through a network interface (e.g., a router, a switch, a gateway, a hub, or an intelligent, dedicated whole-home control node), or through any combination thereof. In some embodiments, the V2I or V2X communication are powered by 5G, which advantageously allows large bandwidth, low latency information sharing between the vehicles and the installations, providing new opportunities for road condition estimation and weather conditions perception. In some embodiments, prior to real-world deployment, V2X interactions are modeled and analyzed using field tests, closed course tests, and/or simulation tools such as Simulation of Urban Mobility (SUMO).

The installations 130 include one or more sensors 660 positioned at the installations 130. The sensors 660 are fixedly located on the installations 130 and are configured to detect, monitor, and gather data on various traffic-related parameters (e.g., vehicle traffic data, including traffic density, an average vehicle speed, honking/beeping from vehicles). In accordance with some embodiments of the present disclosure, the information collected by the sensors 660 are more detailed and instantaneous compared to information collected using a perception system on a single autonomous vehicle, because they have a fixed location, better detection coverage, and a defined field of view. In some embodiments, the one or more sensors incudes one or more of: an imaging sensor, a camera, a microphone (which may be part of the camera or separate from the camera), an anemometer (e.g., a wind speed and direction sensor), a global positioning system (GPS), a thermal sensor (e.g., a temperature sensor), an acoustic sensor, a microphone, a light detection and ranging (LiDAR) scanner, a radio detection and ranging (RADAR) sensor, an infrared sensor, an ultrasonic sensor. In some embodiments, the installations 130 include one or more inductive loop detectors for transmitting and receiving communication signals, and/or detecting the presence or vehicles.

In some embodiments, a respective installation 130 includes a communication module for facilitating information sharing between the vehicles 102 and the installation 130. For example, in some embodiments, the installation 130 gathers, from the vehicles 102 via the communication module, vehicle information 134. The vehicle information 134 can include information about vehicle dynamics (e.g., vehicle velocities and accelerations), vehicle data 112, and/or the additional vehicle information 114. In some embodiments, the vehicle information 134 can also include traffic, road, and/or weather information that are communicated from the vehicles 102 to the installation 130.

In some embodiments, the installation 130 provides at least a subset of infrastructure information 132 to the vehicles 102 and/or the one or more servers 104. The infrastructure information 132 can include sensor data collected by the sensors 660 and/or data processed by a computing unit of the installation 130 based on the sensor data and the vehicle information 134.

It is noted that the installation 130 illustrated in FIG. 1 does not reflect an actual size of the installation 130. In some embodiments, the installation 130 corresponds to an existing structure (e.g., a light pole, a billboard) standing near or on the road. Alternatively, in some embodiments, the installation 130 is a dedicated structure built at a fixed location near or on the road for collecting information of local road or whether conditions. The installation 130 may not be visible or discernable to passing vehicles from its appearance.

Figure 2:
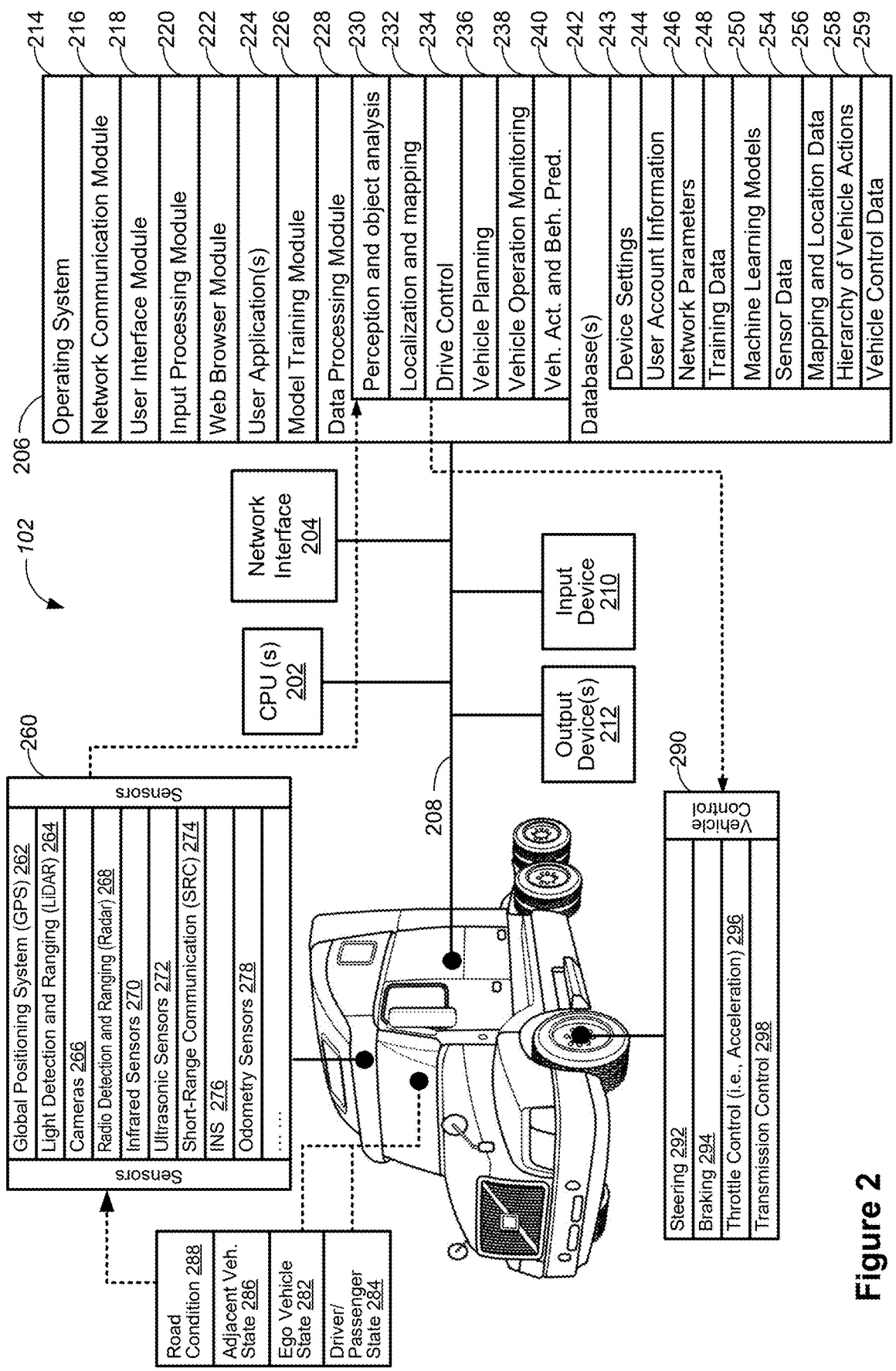
FIG. 2 is a block diagram of an example vehicle configured to be driven with a certain level of autonomy, in accordance with some embodiments.

FIG. 2 is a block diagram of an example vehicle 102 configured to be driven with a certain level of autonomy, in accordance with some embodiments. The vehicle 102 typically includes one or more processing units (CPUs) 202, one or more network interfaces 204, memory 206, and one or more communication buses 208 for interconnecting these components (sometimes called a chipset). The vehicle 102 includes one or more user interface devices. The user interface devices include one or more input devices 210, which facilitate user input, such as a keyboard, a mouse, a voice-command input unit or microphone, a touch screen display, a touch-sensitive input pad, a gesture capturing camera, or other input buttons or controls. Furthermore, in some embodiments, the vehicle 102 uses a microphone and voice recognition or a camera and gesture recognition to supplement or replace the keyboard. In some embodiments, the one or more input devices 210 include one or more cameras, scanners, or photo sensor units for capturing images, for example, of a driver and a passenger in the vehicle 102. The vehicle 102 also includes one or more output devices 212, which enable presentation of user interfaces and display content, including one or more speakers and/or one or more visual displays (e.g., a display panel located near to a driver's right hand in right-hand-side operated vehicles typical in the U.S.).

The vehicle 102 includes a plurality of sensors 260 configured to collect sensor data in a vehicle driving environment 100. The plurality of sensors 260 include one or more of a GPS 262, a LiDAR scanner 264, one or more cameras 266, a RADAR sensor 268, an infrared sensor 270, one or more ultrasonic sensors 272, an SRC module 274, an INS 276 including accelerometers and gyroscopes, and an odometry sensor 278. The GPS 262 localizes the vehicle 102 in Earth coordinates (e.g., using a latitude value and a longitude value) and can reach a first accuracy level less than 1 meter (e.g., 30 cm). The LiDAR scanner 264 uses light beams to estimate relative distances between the scanner 264 and a target object (e.g., another vehicle 102), and can reach a second accuracy level better than the first accuracy level of the GPS 262. The cameras 266 are installed at different locations on the vehicle 102 to monitor surroundings of the camera 266 from different perspectives. In some situations, a camera 266 is installed facing the interior of the vehicle 102 and configured to monitor the state of the driver of the vehicle 102. The RADAR sensor 268 emits electromagnetic waves and collects reflected waves to determine the speed and a distance of an object over which the waves are reflected. The infrared sensor 270 identifies and tracks objects in an infrared domain when lighting conditions are poor. The one or more ultrasonic sensors 272 are used to detect objects at a short distance (e.g., to assist parking). The SRC module 274 is used to exchange information with a road feature (e.g., a traffic light). The INS 276 uses the accelerometers and gyroscopes to measure the position, the orientation, and the speed of the vehicle. The odometry sensor 278 tracks the distance the vehicle 102 has travelled, (e.g., based on a wheel speed). In some embodiments, based on the sensor data collected by the plurality of sensors 260, the one or more processors 202 of the vehicle monitor its own vehicle state 282, the driver or passenger state 284, states of adjacent vehicles 286, and road conditions 288 associated with a plurality of road features.

The vehicle 102 has a control system 290, including a steering control 292, a braking control 294, a throttle control 296, a transmission control 298, signaling and lighting controls, and other controls. In some embodiments, one or more actuators of the vehicle control system 290 are automatically controlled based on the sensor data collected by the plurality of sensors 260 (e.g., according to one or more of the vehicle state 282, the driver or passenger state 284, states of adjacent vehicles 286, and/or road conditions 288).

The memory 206 includes high-speed random access memory, such as DRAM, SRAM, DDR RAM, or other random access solid state memory devices. In some embodiments, the memory includes non-volatile memory, such as one or more magnetic disk storage devices, one or more optical disk storage devices, one or more flash memory devices, or one or more other non-volatile solid state storage devices. In some embodiments, the memory 206 includes one or more storage devices remotely located from one or more processing units 202. The memory 206, or alternatively the non-volatile the memory within the memory 206, includes a non-transitory computer readable storage medium. In some embodiments, the memory 206, or the non-transitory computer readable storage medium of the memory 206, stores the following programs, modules, and data structures, or a subset or superset thereof:

- an operating system 214, which includes procedures for handling various basic system services and for performing hardware dependent tasks;
- a network communication module 216, which connects each vehicle 102 to other devices (e.g., another vehicle 102, a server 104, or a client device 108) via one or more network interfaces (wired or wireless) and one or more communication networks 110, such as the Internet, other wide area networks, local area networks, metropolitan area networks, and so on;
- a user interface module 218, which enables presentation of information (e.g., a graphical user interface for an application 224, widgets, websites and web pages thereof, audio content, and/or video content) at the vehicle 102 via one or more output devices 212 (e.g., displays or speakers);
- an input processing module 220, which detects one or more user inputs or interactions from one of the one or more input devices 210 and interprets the detected input or interaction;
- a web browser module 222, which navigates, requests (e.g., via HTTP), and displays websites and web pages thereof, including a web interface for logging into a user account of a user application 224 associated with the vehicle 102 or another vehicle;
- one or more user applications 224, which are executed at the vehicle 102. The user applications 224 include a vehicle user application that controls the vehicle 102 and enables users to edit and review settings and data associated with the vehicle 102;
- a model training module 226, which trains a machine learning model 250. The model 250 includes at least one neural network and is applied to process vehicle data (e.g., sensor data and vehicle control data) of the vehicle 102;
- a data processing module 228, which performs a plurality of on-vehicle tasks, including, but not limited to, perception and object analysis 230, vehicle localization and environment mapping 232, vehicle drive control 234, vehicle drive planning 236, local operation monitoring 238, and vehicle action and behavior prediction 240;
- a vehicle database 242, which stores vehicle data 112, including:
  - device settings 243, including common device settings (e.g., service tier, device model, storage capacity, processing capabilities, communication capabilities, and/or medical procedure settings) of the vehicle 102;
  - user account information 244 for the one or more user applications 224 (e.g., user names, security questions, account history data, user preferences, and predefined account settings);
  - network parameters 246 for the one or more communication networks 110, (e.g., IP address, subnet mask, default gateway, DNS server, and host name);
  - training data 248 for training the machine learning model 250;
  - machine learning models 250 for processing vehicle data 112, where in some embodiments, the machine learning model 250 is applied to process one or more images captured by a first vehicle 102A and predict a sequence of vehicle actions of a second vehicle through a hierarchy of interconnected vehicle actions;
  - sensor data 254 captured or measured by the plurality of sensors 260;
  - mapping and location data 256, which is determined from the sensor data 254 to map the vehicle driving environment 100 and locations of the vehicle 102 in the environment 100;
  - a hierarchy of interconnected vehicle actions 258 including a plurality of predefined vehicle actions that are organized to define a plurality of vehicle action sequences; and
  - vehicle control data 259, which is automatically generated by the vehicle 102 or manually input by the user via the vehicle control system 290 based on predicted vehicle actions to drive the vehicle 102.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory 206 stores a subset of the modules and data structures identified above. In some embodiments, the memory 206 stores additional modules and data structures not described above.

Figure 3:
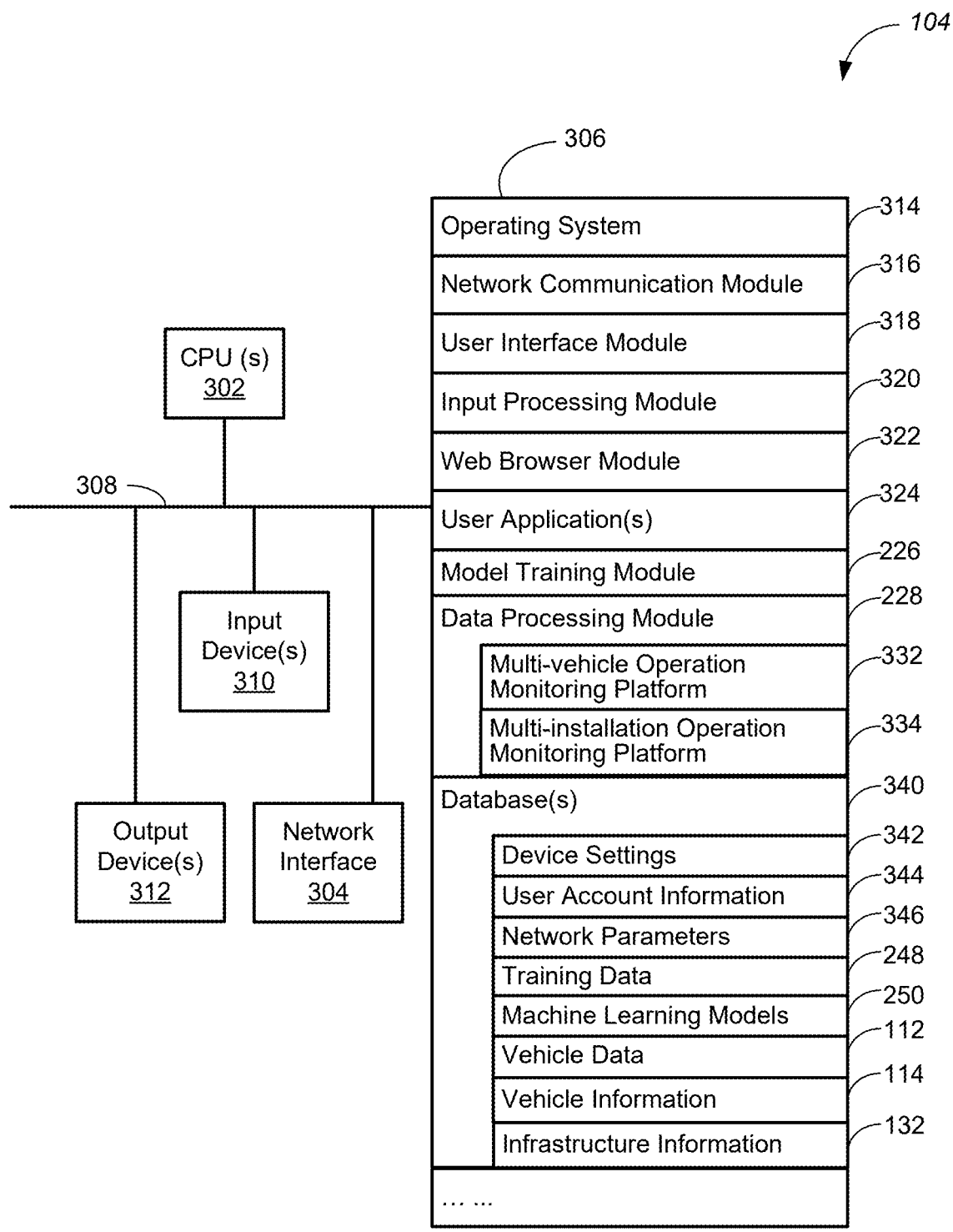
FIG. 3 is a block diagram of an example server for monitoring and managing vehicles in a vehicle driving environment, in accordance with some embodiments.

FIG. 3 is a block diagram of a server 104 for monitoring and managing vehicles 102 in a vehicle driving environment (e.g., the environment 100 in FIG. 1), in accordance with some embodiments. Examples of the server 104 include, but are not limited to, a server computer, a desktop computer, a laptop computer, a tablet computer, or a mobile phone. The server 104 typically includes one or more processing units (CPUs) 302, one or more network interfaces 304, memory 306, and one or more communication buses 308 for interconnecting these components (sometimes called a chipset). The server 104 includes one or more user interface devices. The user interface devices include one or more input devices 310, which facilitate user input, such as a keyboard, a mouse, a voice-command input unit or microphone, a touch screen display, a touch-sensitive input pad, a gesture capturing camera, or other input buttons or controls. Furthermore, in some embodiments, the server 104 uses a microphone and voice recognition or a camera and gesture recognition to supplement or replace the keyboard. In some embodiments, the one or more input devices 310 include one or more cameras, scanners, or photo sensor units for capturing images, for example, of graphic serial codes printed on electronic devices. The server 104 also includes one or more output devices 312, which enable presentation of user interfaces and display content, including one or more speakers and/or one or more visual displays.

The memory 306 includes high-speed random access memory, such as DRAM, SRAM, DDR RAM, or other random access solid state memory devices. In some embodiments, the memory includes non-volatile memory, such as one or more magnetic disk storage devices, one or more optical disk storage devices, one or more flash memory devices, or one or more other non-volatile solid state storage devices. In some embodiments, the memory 306 includes one or more storage devices remotely located from one or more processing units 302. The memory 306, or alternatively the non-volatile memory within memory 306, includes a non-transitory computer readable storage medium. In some embodiments, the memory 306, or the non-transitory computer readable storage medium of the memory 306, stores the following programs, modules, and data structures, or a subset or superset thereof:

- an operating system 314, which includes procedures for handling various basic system services and for performing hardware dependent tasks;
- a network communication module 316, which connects the server 104 to other devices (e.g., vehicles 102, another server 104, and/or client devices 108) via one or more network interfaces (wired or wireless) and one or more communication networks 110, such as the Internet, other wide area networks, local area networks, metropolitan area networks, and so on;
- a user interface module 318, which enables presentation of information (e.g., a graphical user interface for user application 324, widgets, websites and web pages thereof, audio content, and/or video content) at the vehicle 102 via one or more output devices 312 (e.g., displays or speakers);
- an input processing module 320, which detects one or more user inputs or interactions from one of the one or more input devices 310 and interprets the detected input or interaction;
- a web browser module 322, which navigates, requests (e.g., via HTTP), and displays websites and web pages thereof, including a web interface for logging into a user account of a user application 324;
- one or more user applications 324, which are executed at the server 104. The user applications 324 include a vehicle user application that associates vehicles 102 with user accounts and facilitates controlling the vehicles 102, and enables users to edit and review settings and data associated with the vehicles 102;
- a model training module 226, which trains a machine learning model 250, where the model 250 includes at least one neural network and is applied to process vehicle data (e.g., sensor data and vehicle control data) of one or more vehicles 102;
- a data processing module 228, which manages:
  - a multi-vehicle operation monitoring platform 332 configured to collect vehicle data 112 from a plurality of vehicles 102, monitor vehicle operation, detect faults, provide driving solutions, and update additional vehicle information 114 to individual vehicles 102 or client devices 108. The data processing module 228 manages vehicle data 112 for each individual vehicle 102 separately or processes vehicle data 112 of multiple vehicles 102 jointly (e.g., statistically, in the aggregate); and
  - a multi-installation operation monitoring platform 334 configured to collect infrastructure information 132 from a plurality of installations 130, monitor installation operation, detect faults (e.g., sensor 660 faults). In some embodiments, infrastructure information 132 for each individual installation 130 is managed separately. In some embodiments, infrastructure information 132 from multiple installations 130 are processed jointly (e.g., statistically, in the aggregate);
- one or more databases 340 for storing vehicle server data and infrastructure (e.g., installation) data, including:
  - device settings 342, which include common device settings (e.g., service tier, device model, storage capacity, processing capabilities, communication capabilities, and/or medical procedure settings) of the server 104;
  - user account information 344 for the one or more user applications 324 (e.g., user names, security questions, account history data, user preferences, and predefined account settings);
  - network parameters 346 for the one or more communication networks 110, (e.g., IP address, subnet mask, default gateway, DNS server, and host name);
  - training data 248 for training the machine learning model 250;
  - machine learning models 250 for processing vehicle data;
  - vehicle data 112, which is collected from a plurality of vehicles 102 and includes sensor data 254, mapping and location data 256, and vehicle control data 259;
  - additional vehicle information 114, including vehicle operation information, fault information, and/or driving solution information, which are generated from the collected vehicle data 112; and infrastructure information 132, including data collected by sensors 660 of the installations 130 and data processed by the installations 130 based on the data collected by the sensors 660 and the vehicle information 134.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory 306 stores a subset of the modules and data structures identified above. In some embodiments, the memory 306 stores additional modules and data structures not described above.

Figure 4:
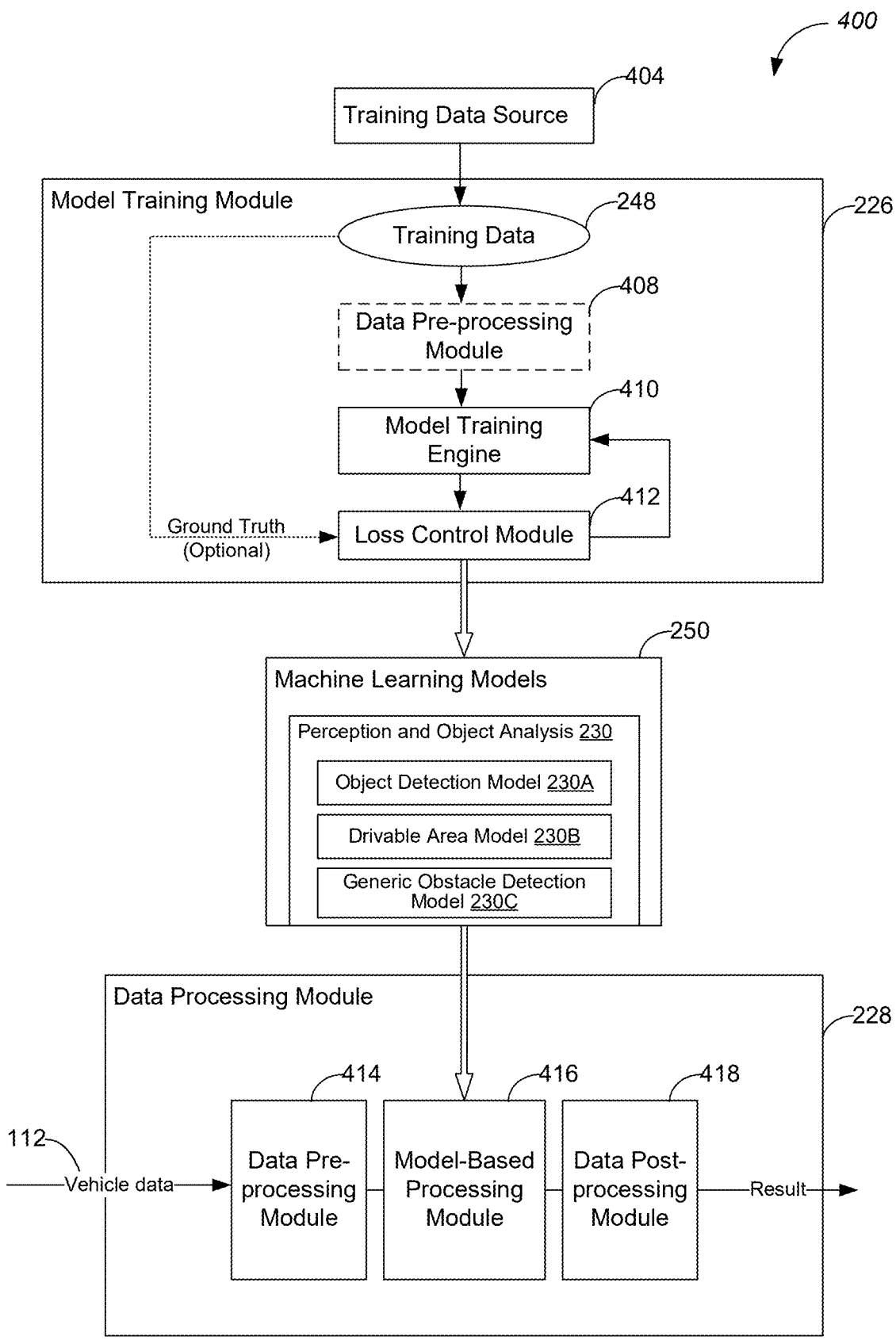
FIG. 4 is a block diagram of a machine learning system for training and applying vehicle data processing models for facilitating at least partial autonomous driving of a vehicle, in accordance with some embodiments.
Figure 5A:
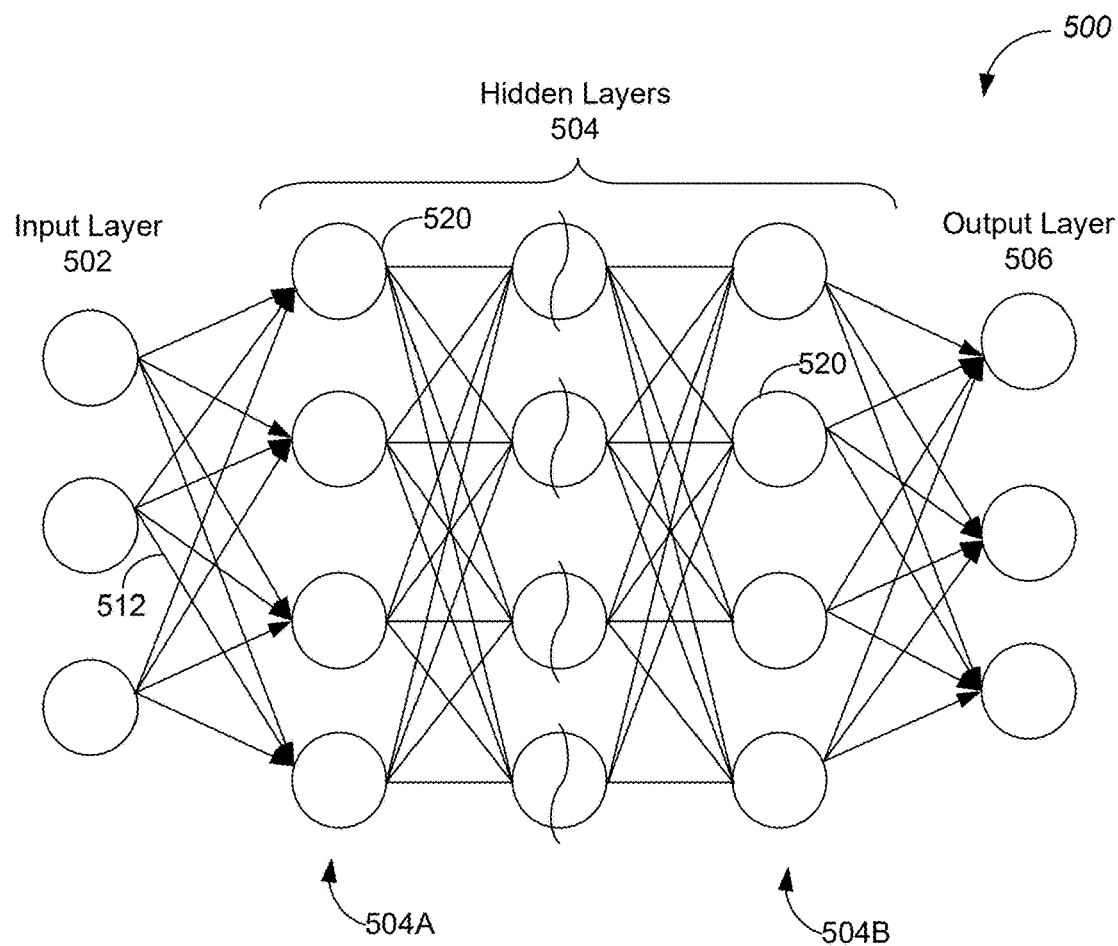
FIG. 5A is a structural diagram of an example neural network applied to process vehicle data in a vehicle data processing model, in accordance with some embodiments.
Figure 5B:
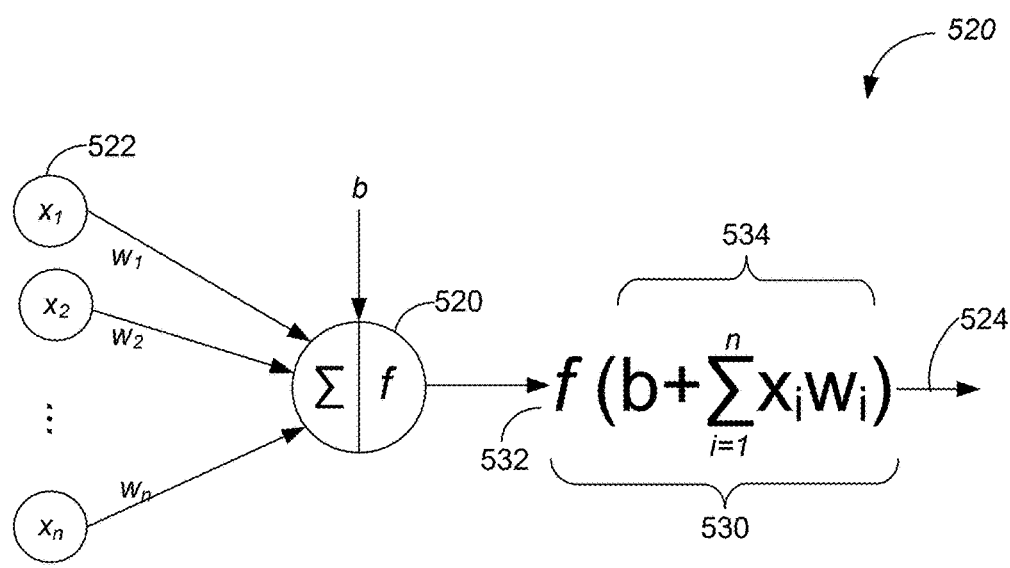
FIG. 5B is an example node in the neural network, in accordance with some embodiments.
Figure 6:
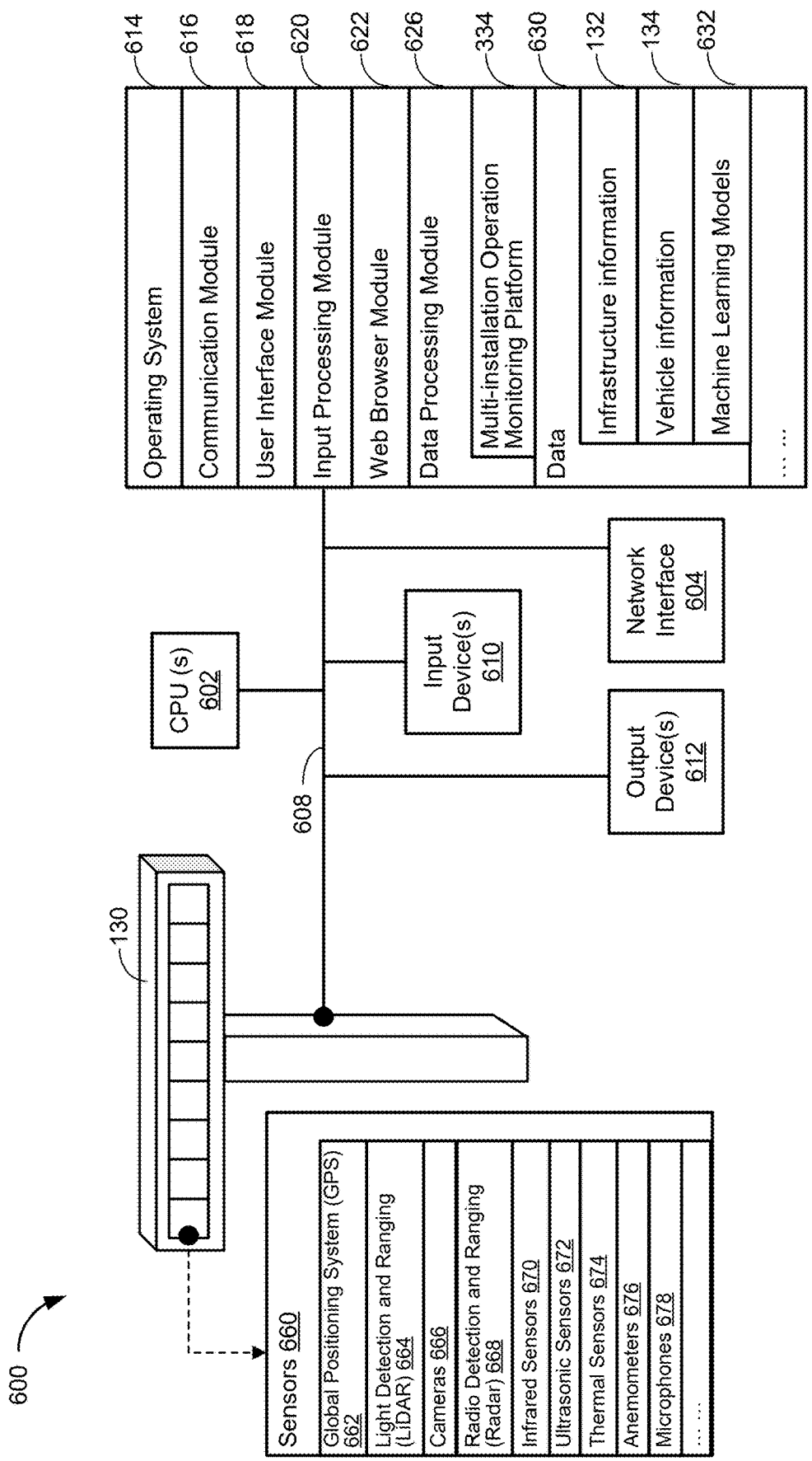
FIG. 6 is a block diagram of a computer system associated with an installation, in accordance with some embodiments.

FIGS. 4, 5A, and 5B provide background on the machine learning systems described herein, which are helpful in understanding the details of the embodiments described from FIG. 6 onward.

FIG. 4 is a block diagram of a machine learning system 400 for training and applying machine learning models 250 for facilitating driving of a vehicle, in accordance with some embodiments. The machine learning system 400 includes a model training module 226 establishing one or more machine learning models 250 and a data processing module 228 for processing vehicle data 112 using the machine learning model 250. In some embodiments, both the model training module 226 (e.g., the model training module 226 in FIG. 2) and the data processing module 228 are located within the vehicle 102, while a training data source 404 provides training data 248 to the vehicle 102. In some embodiments, the training data source 404 is the data obtained from the vehicle 102 itself, from a server 104, from storage 106, or from another vehicle or vehicles 102. Alternatively, in some embodiments, the model training module 226 (e.g., the model training module 226 in FIG. 3) is located at a server 104, and the data processing module 228 is located in a vehicle 102. The server 104 trains the data processing models 250 and provides the trained models 250 to the vehicle 102 to process real-time vehicle data 112 detected by the vehicle 102. In some embodiments, the training data 248 provided by the training data source 404 include a standard dataset (e.g., a set of road images) widely used by engineers in the autonomous vehicle industry to train machine learning models 250. In some embodiments, the training data 248 includes vehicle data 112 and/or additional vehicle information 114, which is collected from one or more vehicles 102 that will apply the machine learning models 250 or collected from distinct vehicles 102 that will not apply the machine learning models 250. The vehicle data 112 further includes one or more of sensor data 254, road mapping and location data 256, and control data 259. Further, in some embodiments, a subset of the training data 248 is modified to augment the training data 248. The subset of modified training data is used in place of or jointly with the subset of training data 248 to train the machine learning models 250.

In some embodiments, the model training module 226 includes a model training engine 410, and a loss control module 412. Each machine learning model 250 is trained by the model training engine 410 to process corresponding vehicle data 112 to implement a respective on-vehicle task. The on-vehicle tasks include, but are not limited to, perception and object analysis 230, vehicle localization and environment mapping 232, vehicle drive control 234, vehicle drive planning 236, local operation monitoring 238, and vehicle action and behavior prediction 240 (FIG. 2). Specifically, the model training engine 410 receives the training data 248 corresponding to a machine learning model 250 to be trained, and processes the training data to build the machine learning model 250. In some embodiments, during this process, the loss control module 412 monitors a loss function comparing the output associated with the respective training data item to a ground truth of the respective training data item. In these embodiments, the model training engine 410 modifies the machine learning models 250 to reduce the loss, until the loss function satisfies a loss criteria (e.g., a comparison result of the loss function is minimized or reduced below a loss threshold). The machine learning models 250 are thereby trained and provided to the data processing module 228 of a vehicle 102 to process real-time vehicle data 112 from the vehicle.

In some embodiments, the model training module 226 further includes a data pre-processing module 408 configured to pre-process the training data 248 before the training data 248 is used by the model training engine 410 to train a machine learning model 250. For example, an image pre-processing module 408 is configured to format road images in the training data 248 into a predefined image format. For example, the preprocessing module 408 may normalize the road images to a fixed size, resolution, or contrast level. In another example, an image pre-processing module 408 extracts a region of interest (ROI) corresponding to a drivable area in each road image or separates content of the drivable area into a distinct image.

In some embodiments, the model training module 226 uses supervised learning in which the training data 248 is labelled and includes a desired output for each training data item (also called the ground truth in some situations). In some embodiments, the desirable output is labelled manually by people or labelled automatically by the model training model 226 before training. In some embodiments, the model training module 226 uses unsupervised learning in which the training data 248 is not labelled. The model training module 226 is configured to identify previously undetected patterns in the training data 248 without pre-existing labels and with little or no human supervision. Additionally, in some embodiments, the model training module 226 uses partially supervised learning in which the training data is partially labelled.

In some embodiments, the data processing module 228 includes a data pre-processing module 414, a model-based processing module 416, and a data post-processing module 418. The data pre-processing modules 414 pre-processes vehicle data 112 based on the type of the vehicle data 112. In some embodiments, functions of the data pre-processing modules 414 are consistent with those of the pre-processing module 408, and convert the vehicle data 112 into a pre-defined data format that is suitable for the inputs of the model-based processing module 416. The model-based processing module 416 applies the trained machine learning model 250 provided by the model training module 226 to process the pre-processed vehicle data 112. In some embodiments, the model-based processing module 416 also monitors an error indicator to determine whether the vehicle data 112 has been properly processed in the machine learning model 250. In some embodiments, the processed vehicle data is further processed by the data post-processing module 418 to create a preferred format or to provide additional vehicle information 114 that can be derived from the processed vehicle data. The data processing module 228 uses the processed vehicle data to at least partially autonomously drive the vehicle 102 (e.g., at least partially autonomously). For example, the processed vehicle data includes vehicle control instructions that are used by the vehicle control system 290 to drive the vehicle 102.

In some embodiments, the data processing module 228 of the vehicle 102 (e.g., a first vehicle) is applied to perform perception and object analysis 230 by obtaining a road image including a road surface along which the first vehicle is travelling, identifying one or more identifiable objects on the road surface in the road image, and detecting a plurality of objects on the road surface in the road image. The data processing module 228 eliminates the one or more identifiable objects from the plurality of objects in the road image to determine one or more unidentifiable objects on the road surface in the road image. The first vehicle is at least partially autonomously driven by treating the one or more unidentifiable objects differently from the one or more identifiable objects. Further, in some embodiments, the machine learning models 250 of the vehicle 102 includes an object detection model 230A and a drivable area model 230B. The object detection model 230A is configured to identify the one or more identifiable objects in the road image and associate each identifiable object with a predefined object type or class. The drivable area model 230B is configured to determine a road surface in the road image. Additionally, in some embodiments, the machine learning models 250 includes a generic obstacle detection model 230C configured to detect a plurality of objects on the road surface in the road image, e.g., with or without determining a predefined object type or class of each of the plurality of objects. The generic obstacle detection model 230C is optionally modified from the drivable area model 230C by way of retraining.

FIG. 5A is a structural diagram of an example neural network 500 applied to process vehicle data in a machine learning model 250, in accordance with some embodiments, and FIG. 5B is an example node 520 in the neural network 500, in accordance with some embodiments. It should be noted that this description is used as an example only, and other types or configurations may be used to implement the embodiments described herein. The machine learning model 250 is established based on the neural network 500. A corresponding model-based processing module 416 applies the machine learning model 250 including the neural network 500 to process vehicle data 112 that has been converted to a predefined data format. The neural network 500 includes a collection of nodes 520 that are connected by links 512. Each node 520 receives one or more node inputs 522 and applies a propagation function 530 to generate a node output 524 from the one or more node inputs. As the node output 524 is provided via one or more links 512 to one or more other nodes 520, a weight w associated with each link 512 is applied to the node output 524. Likewise, the one or more node inputs 522 are combined based on corresponding weights $w_1$, $w_2$, $w_3$, and $w_4$ according to the propagation function 530. In an example, the propagation function 530 is computed by applying a non-linear activation function 532 to a linear weighted combination 534 of the one or more node inputs 522.

The collection of nodes 520 is organized into layers in the neural network 500. In general, the layers include an input layer 502 for receiving inputs, an output layer 506 for providing outputs, and one or more hidden layers 504 (e.g., layers 504A and 504B) between the input layer 502 and the output layer 506. A deep neural network has more than one hidden layer 504 between the input layer 502 and the output layer 506. In the neural network 500, each layer is only connected with its immediately preceding and/or immediately following layer. In some embodiments, a layer is a "fully connected" layer because each node in the layer is connected to every node in its immediately following layer. In some embodiments, a hidden layer 504 includes two or more nodes that are connected to the same node in its immediately following layer for down sampling or pooling the two or more nodes. In particular, max pooling uses a maximum value of the two or more nodes in the layer for generating the node of the immediately following layer.

In some embodiments, a convolutional neural network (CNN) is applied in a machine learning model 250 to process vehicle data (e.g., video and image data captured by cameras 266 of a vehicle 102). The CNN employs convolution operations and belongs to a class of deep neural networks. The hidden layers 504 of the CNN include convolutional layers. Each node in a convolutional layer receives inputs from a receptive area associated with a previous layer (e.g., nine nodes). Each convolution layer uses a kernel to combine pixels in a respective area to generate outputs. For example, the kernel may be to a 3×3 matrix including weights applied to combine the pixels in the respective area surrounding each pixel. Video or image data is pre-processed to a predefined video/image format corresponding to the inputs of the CNN. In some embodiments, the pre-processed video or image data is abstracted by the CNN layers to form a respective feature map. In this way, video and image data can be processed by the CNN for video and image recognition or object detection.

In some embodiments, a recurrent neural network (RNN) is applied in the machine learning model 250 to process vehicle data 112. Nodes in successive layers of the RNN follow a temporal sequence, such that the RNN exhibits a temporal dynamic behavior. In an example, each node 520 of the RNN has a time-varying real-valued activation. It is noted that in some embodiments, two or more types of vehicle data are processed by the data processing module 228, and two or more types of neural networks (e.g., both a CNN and an RNN) are applied in the same machine learning model 250 to process the vehicle data jointly.

The training process is a process for calibrating all of the weights $w_i$ for each layer of the neural network 500 using training data 248 that is provided in the input layer 502. The training process typically includes two steps, forward propagation and backward propagation, which are repeated multiple times until a predefined convergence condition is satisfied. In the forward propagation, the set of weights for different layers are applied to the input data and intermediate results from the previous layers. In the backward propagation, a margin of error of the output (e.g., a loss function) is measured (e.g., by a loss control module 412), and the weights are adjusted accordingly to decrease the error. The activation function 532 can be linear, rectified linear, sigmoidal, hyperbolic tangent, or other types. In some embodiments, a network bias term b is added to the sum of the weighted combination 534 from the previous layer before the activation function 532 is applied. The network bias b provides a perturbation that helps the neural network 500 avoid over fitting the training data. In some embodiments, the result of the training includes a network bias parameter b for each layer.

FIG. 6 is a block diagram of a computer system 600 associated with an installation 130 for detecting conditions for vehicle driving in a vehicle driving environment (e.g., the environment 100 in FIG. 1), in accordance with some embodiments. The installation 130 includes a plurality of sensors 660. In some embodiments, the plurality of sensors 660 include one or more of a GPS 662, a LIDAR scanner 664, one or more cameras 666, a RADAR sensor 668, one or more infrared sensor 670, one or more ultrasonic sensors 672, one or more thermal sensors 674 (e.g., for measuring heat and/or temperature), one or more anemometers 676 for measuring wind speed and wind direction, and one or more microphones 678 for capturing audio in a vicinity of the installation 130. In some embodiments, the one or more microphones 678 are part of the cameras 666. In some embodiments, the one or more microphones 678 are separate from the cameras 666. In some embodiments, the plurality of sensors 660 include one or more inductive loop detectors 680 for transmitting and receiving communication signals, and/or detecting the presence or vehicles.

In some embodiments, the computer system 600 is physically co-located at the installation 130. For example, the computer system 600 includes a microcontroller chip that is located locally at the installation 130, and at least a subset of the data collected at the installation 130 (e.g., using the sensors 660) is processed locally by the computer system 600. In some embodiments, the computer system 600 is at a physical location different from the installation 130. For example, the computer system 600 can include a cloud computer system that is communicatively connected to the installation 130. In some embodiments, the computer system includes one or more distinct systems located at distinct locations of a road or distinct systems located at different roads. Examples of the computer system 600 include, but are not limited to, a server computer, a desktop computer, a laptop computer, a tablet computer, or a mobile phone. The computer system 600 typically includes one or more processing units (CPUs) 602, one or more network interfaces 604, memory 606, and one or more communication buses 608 for interconnecting these components (sometimes called a chipset). The computer system 600 includes one or more user interface devices. The user interface devices include one or more input devices 610, which facilitate user input, such as a keyboard, a mouse, a voice-command input unit or microphone, a touch screen display, a touch-sensitive input pad, a gesture capturing camera, or other input buttons or controls. Furthermore, in some embodiments, the computer system 600 uses a microphone and voice recognition or a camera and gesture recognition to supplement or replace the keyboard. In some embodiments, the one or more input devices 610 include one or more cameras, scanners, or photo sensor units for capturing images, for example, of graphic serial codes printed on electronic devices. The computer system 600 also includes one or more output devices 610, which enable presentation of user interfaces and display content, including one or more speakers and/or one or more visual displays.

The memory 606 includes high-speed random access memory, such as DRAM, SRAM, DDR RAM, or other random access solid state memory devices. In some embodiments, the memory includes non-volatile memory, such as one or more magnetic disk storage devices, one or more optical disk storage devices, one or more flash memory devices, or one or more other non-volatile solid state storage devices. In some embodiments, the memory 606 includes one or more storage devices remotely located from the one or more processing units 602. The memory 606, or alternatively the non-volatile memory within memory 606, includes a non-transitory computer readable storage medium. In some embodiments, the memory 606, or the non-transitory computer readable storage medium of the memory 606, stores the following programs, modules, and data structures, or a subset or superset thereof:

an operating system 614, which includes procedures for handling various basic system services and for performing hardware dependent tasks;

a communication module 616, which connects the computer system to other devices (e.g., vehicles 102, server 104, installations 130, and/or client devices 108) via one or more network interfaces (wired or wireless) and one or more communication networks 110, such as the Internet, other wide area networks, local area networks, metropolitan area networks, and so on. In some embodiments, the communications module 616 gathers information about road and weather conditions from vehicles 102 via a V2I or a V2X communication system that is installed on the vehicles 102. In some embodiments, the V2I or V2X communication system operate on a network that provides high speed, low latency communication;

a user interface module 618, which enables presentation of information, widgets, websites and web pages thereof, audio content, and/or video content) via one or more output devices 612 (e.g., displays or speakers);

an input processing module 620, which detects one or more user inputs or interactions from one of the one or more input devices 610 and interprets the detected input or interaction;

a web browser module 622, which navigates, requests (e.g., via HTTP), and displays websites and web pages thereof;

a data processing module 626, which manages a multi-installation operation monitoring platform 334 configured to collect infrastructure information 132 from a plurality of installations 130, monitor installation operation, detect faults (e.g., faults from sensors 660). In some embodiments, the data processing module 626 manages infrastructure information 132 for each individual installation 130 separately or processes infrastructure information 132 from multiple installations 130 jointly (e.g., statistically, in the aggregate);

one or more machine learning models 628. In some embodiments, the machine learning models 628 include at least one neural network and is applied to process vehicle traffic data collected by the sensors 660 and output a determination of whether the vehicle traffic data constitutes an event;

data 630 that is stored locally on the computer system 600 or on one or more databases (e.g., database(s) 340), including:

infrastructure information 132. In some embodiments, infrastructure information 132 includes data collected by sensors 660 of installations 130. In some embodiments, infrastructure information 132 includes data that is processed by the installations 130 (e.g., via computer system 600) according to data collected by sensors 660 and/or vehicle information 134;

vehicle information 134. In some embodiments, vehicle information 134 includes information gathered by installations 130 from vehicles 102 via communication module 616. In some embodiments, vehicle information 134 includes information about vehicle dynamics (e.g., vehicle velocities and accelerations), vehicle data 112, and/or the additional vehicle information 114. In some embodiments, the vehicle information 134 includes include traffic, road, and/or weather information that are transmitted from the vehicles 102 to the installations 130; and machine learning models 632.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory 606 stores a subset of the modules and data structures identified above. In some embodiments, the memory 606 stores additional modules and data structures not described above. In some embodiments, a subset of the operations performed at the computer system 600 can also be performed at the server 104.

Figure 7:
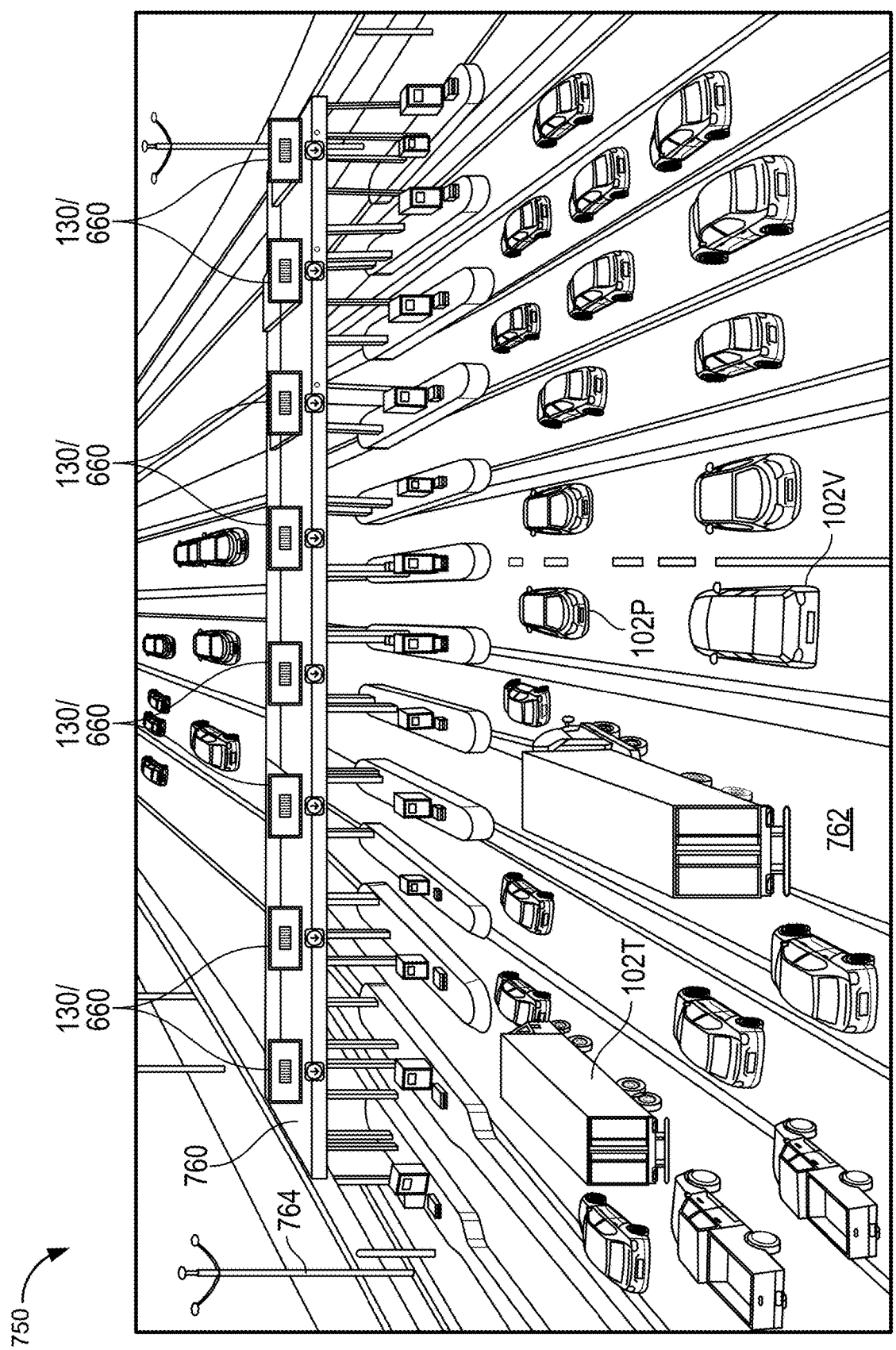
FIG. 7 illustrates an exemplary scene where vehicles are traveling on a road that includes an installation, in accordance with some embodiments.

FIG. 7 shows an exemplary scene 750 where vehicles 102 (e.g., vehicle 102T, vehicle 102P, and vehicle 102V) traveling on a road 762 are approaching a toll booth 760. The toll booth 760 includes fixed installations 130 with sensors 660. In some instances, a fixed installation can be an existing structure on a road, such as a streetlight 764, that is fitted with sensors 660 to facilitate detection of traffic conditions and collection of traffic condition data. In some embodiments, the sensors 660 are configured to capture a perspective view (e.g., an aerial view) of traffic conditions on the road 762. In some embodiments, the sensors 660 can have a detection range that is several hundred meters or several miles from their locations. In some embodiments, the toll booth 760 depicted in FIG. 7 is a zone of interest that is within a detection range of the sensors 660. Other exemplary zones of interest can include a segment of a road a freeway entrance or exit, a lane merge zone, a tunnel, a toll booth, a traffic light area, an on-ramp region of a highway, and a junction or an intersection where two or more roads converge, diverge, meet or cross.

In some embodiments, the installation 130 (e.g., via the CPU(s) 602) generates traffic information according to data collected by the sensors 660. Exemplary traffic information can include real-time information about traffic flow (e.g., an average speed of vehicles traveling on the road, or an average speed of vehicles traveling on a respective lane of the road), traffic signal timings (when the road includes traffic lights), presence of traffic incidents, and/or traffic buildup (e.g., due to bottlenecks at the toll booth 760).

In some embodiments, the installation 130 includes a V2I or V2X communication system (e.g., communication module 616) that facilitates bidirectional communication between the installation 130 and a respective vehicle 102. In some embodiments, the installation 130 (e.g., CPU(s) 602) is configured communicate with respective vehicles on the road 762 using the V2I or V2X communication. For example, in some embodiments, a respective vehicle 102 can transmit, to one or more processors associated the installation 130, information about driving conditions of other vehicles, road conditions, or objects that are detected in a vicinity of the respective vehicle 102. In some embodiments, the information transmitted by the vehicle processors associated the installation 130 are detected using sensors that are located onboard the respective vehicle 102 (e.g., from the perspective of the respective vehicle). In some embodiments, a respective vehicle 102 can also communicate, to the processors of the installation, other information such as road incidents (e.g., accidents or objects falling) occurring in the vicinity of the respective vehicle 102. In some embodiments, the installation 130 (e.g., CPU(s) 602) can generate scene perception and prediction information (e.g., infrastructure information 132) according to data collected by the sensors 660 and data provided by the vehicles. In some embodiments, the installation 130 (e.g., CPU(s) 602) can generate planning suggestions, such as suggested travel trajectories and vehicle control (e.g., speed, acceleration, and brake) conditions, for a respective vehicle. In some embodiments, the installation 130 provides the scene perception and prediction information or planning suggestions to autonomous vehicles that are traveling in the zone of interest, to facilitate autonomous path planning and control. In some embodiments, the scene perception and prediction information or planning suggestions are implemented as a service implemented using V2I or V2X communication.

In some embodiments, the installation 130 includes a computer system 600 that is configured to process data collected by the sensors 660 and the vehicles 102. The computer system 600 can be a local processing unit that is physically co-located at the fixed installation, or a cloud-based processing unit at a different location from the installation. In some embodiments, the computer system 600 executes a data-driven perception model (e.g., a data-driven deep learning model, machine learning models 632) to generate perception data of a scene or a zone of interest. For example, in some embodiments, the perception data can include perspective views (e.g., aerial views or bird's eye views) of the scene or the zone of interest, from the perspective of the sensors 660 and/or installations. In some embodiments, the perception model is configured to predict the motion of at least some of the vehicles that enter a zone of detection of the installation 130. Due to the fixed field of view of the sensors 660 with continuously available data, such data-driven models can be more holistic and complete, while capable of adapting to dynamically changing traffic flows, and be more accurate than individual vehicles' perception and prediction results. In some embodiments, the field of view of the sensors 660 (e.g., coupled with the sensors being at elevated heights in some instances) enable views of obstacles (e.g., vehicle and non-vehicle objects) not in direct sight of an autonomous vehicle to be accurately captured. In some embodiments, the perception data can be used for predicting the behaviors of obstacles (e.g., vehicles and other objects on the road) on the road. The accurate obstacle locations obtained by the centralized perception model can be used for better agent behavior prediction in scenarios including active and passive Merges or cut-in intentions, which enhances assertive drive behavior for autonomous vehicles. The prediction results can be shared with those vehicles that also have V2X capabilities, and potentially as a service.

FIG. 8 illustrates exemplary intersection information 800, in accordance with some embodiments. In some embodiments, the intersection information are generated by one or more processors (e.g., CPU(s) 602) associated with an installation via a perception model (e.g., machine learning model 632).

In some embodiments, an intersection or an at-grade junction is a junction where two or more roads converge, diverge, meet or cross. FIG. 8 show that the intersection information 800 includes an intersection type 802. Exemplary intersection types can include a signaled intersection and a priority level intersection. An example signaled intersection is a four-way road junction where traffic signals are located at each of the four roads before the intersection. An example a priority level intersection (or right-of-way intersection) is a four-way road junction or four-way stop, where stop signs (e.g., instead of traffic signals) are located at each of the four roads before the intersection. In an exemplary scenario, an ego vehicle may arrive at a four-way stop where there are three other vehicles located at the other three roads, but the ego vehicle does not know the sequence of arrival of the other three vehicles. In some embodiments, the processors of the installation 130 (e.g., executing the perception model) can provide the ego vehicle with information regarding the sequence of arrival of the vehicles at the intersection.

With continued reference to FIG. 8, in some embodiments, the intersection information 800 includes location information 804 of the intersection, which can be defined using GPS coordinates of a center position of the intersection or names of cross-streets that intersect the intersection. The intersection information 800 can also include status information 806 of the intersection, such as whether the intersection is clear (e.g., uncongested or free of traffic) or not clear (e.g., vehicle found within the intersection).

In some embodiments, the intersection information 800 includes, for each lane (808) of a respective road of the intersection, a respective lane ID 810. In some embodiments, the respective lane ID 810 can be represented by a string of text or numbers where the first digit represents a travel direction and the second digit represents a lane number. In some embodiments, the intersection information 800 includes, for a respective lane of a respective road of the intersection, a respective lane signal 812 (e.g., red, amber, green, stop, or go), an indication 814 as to whether the respective lane is clear (e.g., yes or no), and vehicle information 816 in the respective lane, including a vehicle ID 818, a vehicle location 819 (e.g., (x,y) coordinates or GPS coordinates), a mode 820 (e.g., stop, creep, or fast-go), a time at which the vehicle entered the current mode 822, a vehicle type 824 (e.g., an ambulance, a fire truck, a police car, or other vehicles), a vehicle speed 826, and a vehicle acceleration 828.

In some embodiments, the perception model applies a rule-based logic when the zone of interest is a road intersection. An example rule-based logic includes:

1. In some embodiments, the processors of an installation 130 (e.g., e.g., CPU(s) 602, executing a perception model) communicate with an ego vehicle (e.g., vehicle 102) as the ego vehicle approaches a road intersection. For example, the processors of the installation transmit, to the ego vehicle, messages that include at least a subset of the intersection information 800. In some embodiments, the messages are transmitted at a predetermined frequency, such as 1 Hz (e.g., 1 message every second), 5 Hz (e.g., 5 messages every second), or 10 Hz (e.g., 10 messages every second).
2. In some embodiments, the ego vehicle combines (e.g., fuses) the intersection information from the CPU(s) 602 with data collected by sensors located on the ego vehicle, to generate a driving scenario. In some embodiments, the driving scenario is generated by the processors of the installation. For example, the ego vehicle can transmit, to the processors of the installation, data collected by the ego vehicle's onboard sensors and the processors of the installation are configured to combine the intersection information collected by the sensors 660 and data from the onboard sensors of the vehicle, to generate a driving scenario. In some embodiments, the driving scenario includes a travel route that is displayed on the ego vehicle (e.g., graphically as a map, or as text or audio instructions).
3. In some embodiments, when the ego vehicle arrives at the intersection:
   a. If an ambulance, or a fire truck, or a police car (e.g., with lights flashing or sirens on) is present at the intersection, the processors of the installation can a message to the ego vehicle, to instruct the vehicle to stop moving (or cause the ego vehicle to stop moving).
   b. Otherwise, in some embodiments, if the intersection is a signaled intersection, the processors of the installation are configured to send messages to the ego vehicle. The messages can include instructions for the ego vehicle to proceed (e.g., move) if the signal light is green or amber, or stop if the signal light is red.
   c. In some embodiments, if the intersection is a priority level intersection, the processors of the installation (e.g., via the perception model) are configured to:
      i. filter out traffic far away from intersection,
      ii. filter out traffic status if the status has not changed for a long time, and
      iii. read the status of first car of each lane for each direction. In some embodiments, the processors of the installation are configured to sort the information regarding the status of first car of each lane for each direction along with information from the ego vehicle based on time, regardless of vehicles if those vehicles have been in that status too long. The processors of the installation may apply one or more rules, such as a higher-level vehicle goes first, or vehicles of the same level adopt a first-come-first-go policy.
   d. In some embodiments, once the ego vehicle steps into the intersection, the ego vehicle is configured to the same way as on a regular road. In some embodiments, the ego vehicle is configured to control its brake, throttle, or steering control and at least partially autonomously drive itself according to a status of lane clearance or a prediction of obstacle status. In some embodiments, the lane path is provided by the map whereas the obstacle information is provided by the installation. In some embodiments, the one or more processors of the installation is configured to control the brake, throttle, or steering control of the ego vehicle and cause the ego vehicle to at least partially autonomously drive itself according to a status of lane clearance or a prediction of obstacle status.

Figure 9:
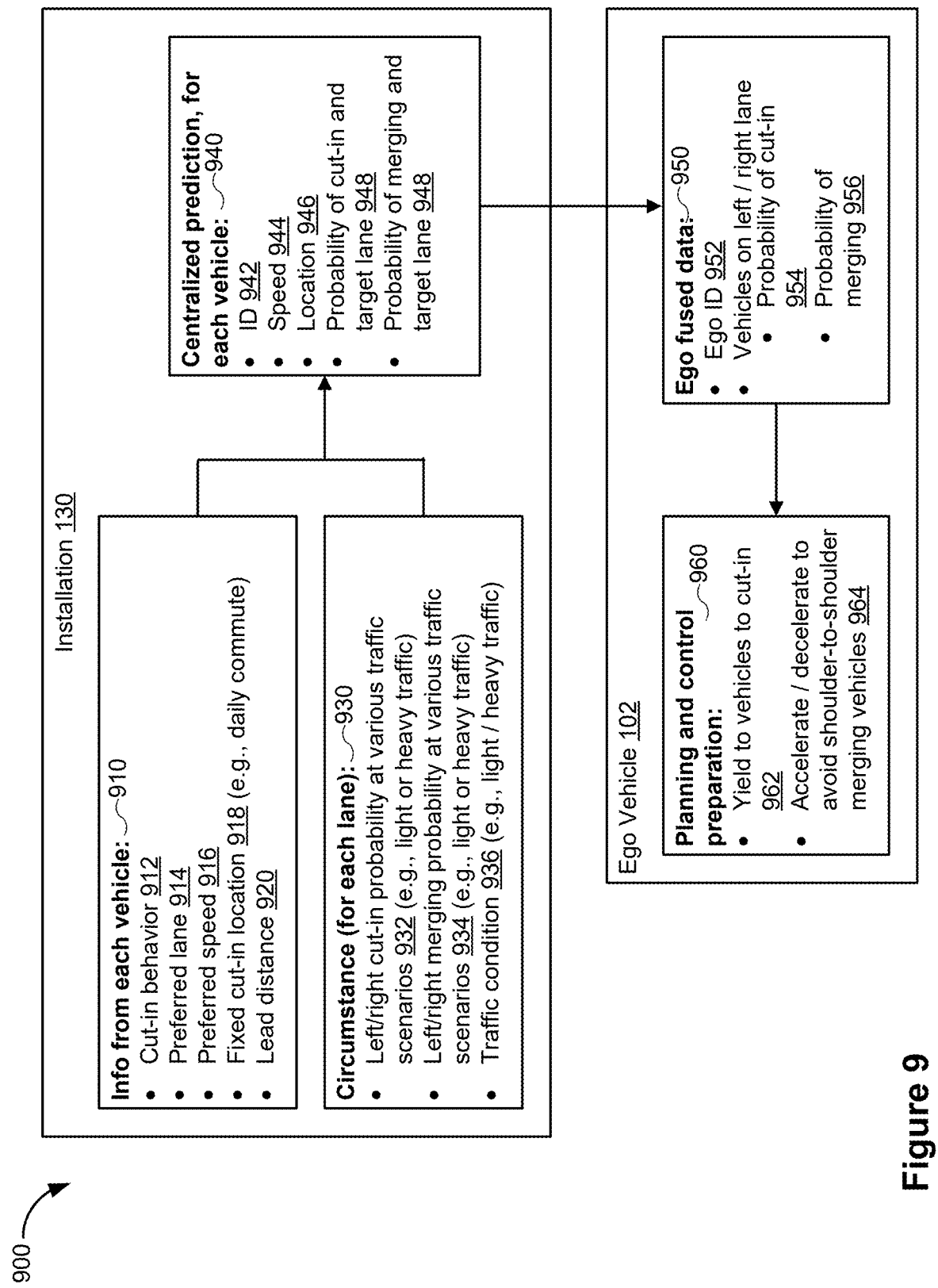
FIG. 9 illustrates an exemplary workflow for at least partially autonomously driving a vehicle based on vehicle prediction data generated by a processor of an installation, in accordance with some embodiments.

FIG. 9 illustrates an exemplary workflow 900 for at least partially autonomously driving a vehicle in a merging zone or in a cut-in maneuver scenario, in accordance with some embodiments. In some embodiments, a lane merger or cut-in maneuver refers to a scenario where a lane-change vehicle drives into the space ahead of a nearby vehicle that is traveling in another lane (e.g., a target lane). Because vehicle actions in such situations can adversely affect roadway capacity and traffic safety, the presence of installations equipped with sensors at fixed viewpoints enables information of vehicle behavior in these scenarios to be accurately captured.

In some embodiments, the CPU(s) 602 determine, according to data collected by sensors 660 at an installation 130 that is positioned in the merging zone or cut-in scenario, information 910 of each vehicle that passes through the merging zone or is involved in the cut-in scenario, and whose data has been captured by the sensors 660. For example, in some embodiments, the information 910 for a respective vehicle includes a cut-in behavior 912 of the respective vehicle (e.g., a time duration for the cut-in behavior, whether the respective vehicle that is cutting into another vehicle's lane has activated its turn signal lights, or whether the other vehicle has applied its emergency brakes), a preferred lane 914 of travel of the respective vehicle, a preferred speed 916 of the respective vehicle, whether there is a fixed cut-in location 918 (e.g., when the respective vehicle is doing a daily commute), and a lead distance 920 between the respective vehicle and an adjacent vehicle traveling in a target lane when the respective vehicle drives into the target lane ahead of the adjacent vehicle.

In some embodiments, the CPU(s) 602 determine, according to data collected by the sensors 660, a respective set of (e.g., one or more) circumstances 930 for each lane of a road in the merging zone or cut-in scenario. In some embodiments, the respective set of circumstances 930 includes a cut-in probability 932 in various traffic scenarios. For example, in some embodiments, the cut-in probability 932 can include respective probability values corresponding to when a vehicle traveling on a left lane of a road cuts into a right lane under light, moderate, or heavy traffic conditions. In some embodiments, the cut-in probability 932 can include respective probability values corresponding to when a vehicle traveling on a right lane of a road cuts into a left lane under light, moderate, or heavy traffic conditions. In some embodiments, the respective set of circumstances 930 includes a merging probability 934 in various traffic scenarios. For example, in some embodiments, the merging probability 934 includes respective probability values corresponding to when a vehicle traveling on a left lane of a road merges into a right lane under light, moderate, or heavy traffic conditions. In some embodiments, the merging probability 934 includes respective probability values corresponding to when a vehicle traveling on a right lane of a road merges into a left lane under light, moderate, or heavy traffic conditions. In some embodiments, the respective set of circumstances 930 includes a traffic condition 936 (e.g., light, moderate, or heavy traffic flow) segment of the road where the lane merger or cut-in behavior occurs.

In some embodiments, the information 910 and the circumstances 930 determined (e.g., generated or collected) by the CPU(s) 602 are input into a perception model (e.g., machine learning models 632) that is configured to generate prediction information 940 for subsequent vehicles traveling through the merging zone. In some embodiments, the installation 130 (e.g., via CPU(s) 602) assigns an ID 942 to an autonomous vehicle 102 and identifies (e.g., recognizes) the autonomous vehicle 102 using the assigned ID 942. In some embodiments, the autonomous vehicle 102 and the installation 130 use the ID 942 as part of a handshake protocol that facilitates communication and exchange of information between the installation 130 and the autonomous vehicle 102. In some embodiments, the prediction information 940 for a respective vehicle includes a predicted vehicle speed 944 as the vehicle merges into another lane, a location 946 of the vehicle when the merging or cut-in behavior occurs, a probability of cut-in and target lane 948, and a probability of merging and target lane 948.

In some embodiments, the CPU(s) 602 are configured to transmit at least a subset of the prediction information 940 to an ego vehicle 102 (e.g., as the ego vehicle 102 approaches a segment of the road corresponding to the merging zone). Exemplary details of message transmission and bidirectional communication between a vehicle and a road installation are described in U.S. application Ser. No. 18/912,574, which is incorporated by reference herein in its entirety.

In some embodiments, the ego vehicle 102 combines the prediction information 940 generated by the CPU(s) 602 with sensor data collected by onboard sensors (e.g., sensors 260) of the ego vehicle 102, and processes the combined information to generate ego fused data 952. As illustrated in FIG. 9, in some embodiments, the ego fused data 950 includes information identifying the ego vehicle (e.g., ego identifier 952). In some embodiments, the ego fused data 950 includes information indicating a likelihood (e.g., a value ranging from 0 to 1 inclusive) that a respective vehicle that is traveling on an adjacent lane of the ego vehicle 102 (e.g., left lane or right lane of the ego vehicle) is going to cut into a lane of travel of the ego vehicle 102 (e.g., probability of cut-in 954). In some embodiments, the ego fused data 950 includes information indicating a likelihood (e.g., a value ranging from 0 to 1 inclusive) that a respective vehicle that is traveling on an adjacent lane of the ego vehicle 102 (e.g., left lane or right lane of the ego vehicle) is going to merge into a lane of travel of the ego vehicle 102 (e.g., probability of merging 956).

Although FIG. 9 shows that the ego fused data is generated by an ego vehicle 102, it will be appreciated by one of ordinary skill in the art that in some embodiments, the combination/fusion of the data can be performed by CPU(s) 602 of the installation 130. For example, in some embodiments, the ego vehicle 102 can transmit to the CPU(s) sensor data collected by onboard sensors (e.g., sensors 260) of the ego vehicle 102 via V2I communication, and the CPU(s) of the installation process the combined information to generate the ego fused data 952 and transmit the ego fused data 952 to the ego vehicle 102. In some embodiments, the ego fused data 952 includes vehicle path planning suggestions. In some embodiments, the CPU(s) 602 provide the ego fused data 952 to the ego vehicle via wireless internet communication as the ego vehicle travels in the zone of interest.

Figure 10:
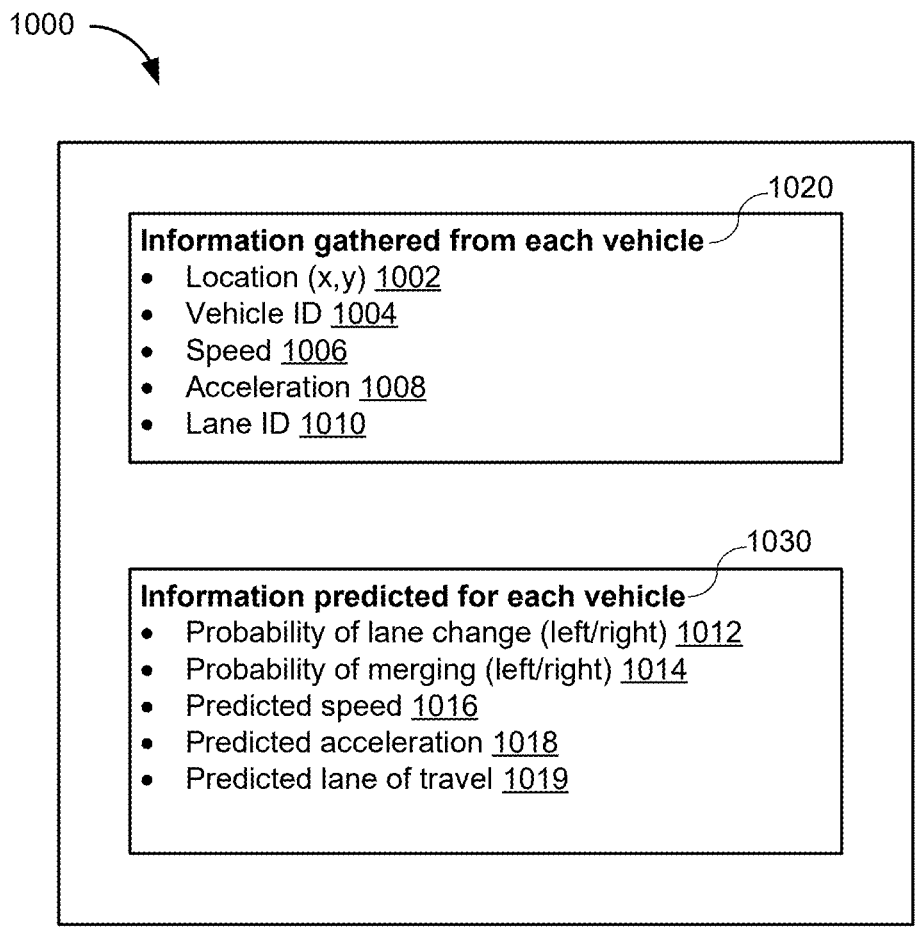
FIG. 10 illustrates exemplary vehicle information 1000 collected by an installation, in accordance with some embodiments.

FIG. 10 illustrates exemplary vehicle information 1000, in accordance with some embodiments. The vehicle information 1000 includes information gathered from each vehicle (1020) from sensors 660 associated with an installation 130, and information predicted (1030) for each vehicle, generated by processors (e.g., CPU(s) 602) associated with the installation 130.

In some embodiments, when a vehicle is within a detection range of the sensors 660, the sensors 660 gather information from a respective vehicle (1020), including a location 1002 (e.g., (x,y) coordinates or GPS coordinates) of the respective vehicle, a vehicle ID 1004, a speed 1006 of the respective vehicle, an acceleration 1008 of the respective vehicle, and a lane of travel (e.g., lane ID 1010) of the respective vehicle.

In some embodiments, the CPU(s) 602 generate predicted information 1030, such as a lane change behavior or lane merging behavior of a respective vehicle, according to data gathered by the sensors 660. In some embodiments, the predicted information includes a probability of lane change 1012 (e.g., a value ranging from 0 to 1 inclusive) and a probability of merging 1014 (e.g., a value ranging from 0 to 1 inclusive). In some embodiments, the predicted information 1030 includes a predicted speed 1016, acceleration 1018, or lane of travel 1019 of one or more vehicles that are currently outside the detection range of the sensors 660, as they approach the sensors detection range.

In some embodiments, the information gathered from each vehicle (1020) and the information predicted (1030) for each vehicle is transmitted from the installation to an autonomous vehicle (e.g., via I2V communication) as that vehicle approaches the zone of interest (e.g., that is within the detection range of the sensors 660). In some embodiments, the autonomous vehicle is configured to determine a travel trajectory based on the predicted information 1030. In some embodiments, the autonomous vehicle is configured to make lane change decisions based on a cost function, as will be described in FIG. 11.

Figure 11:
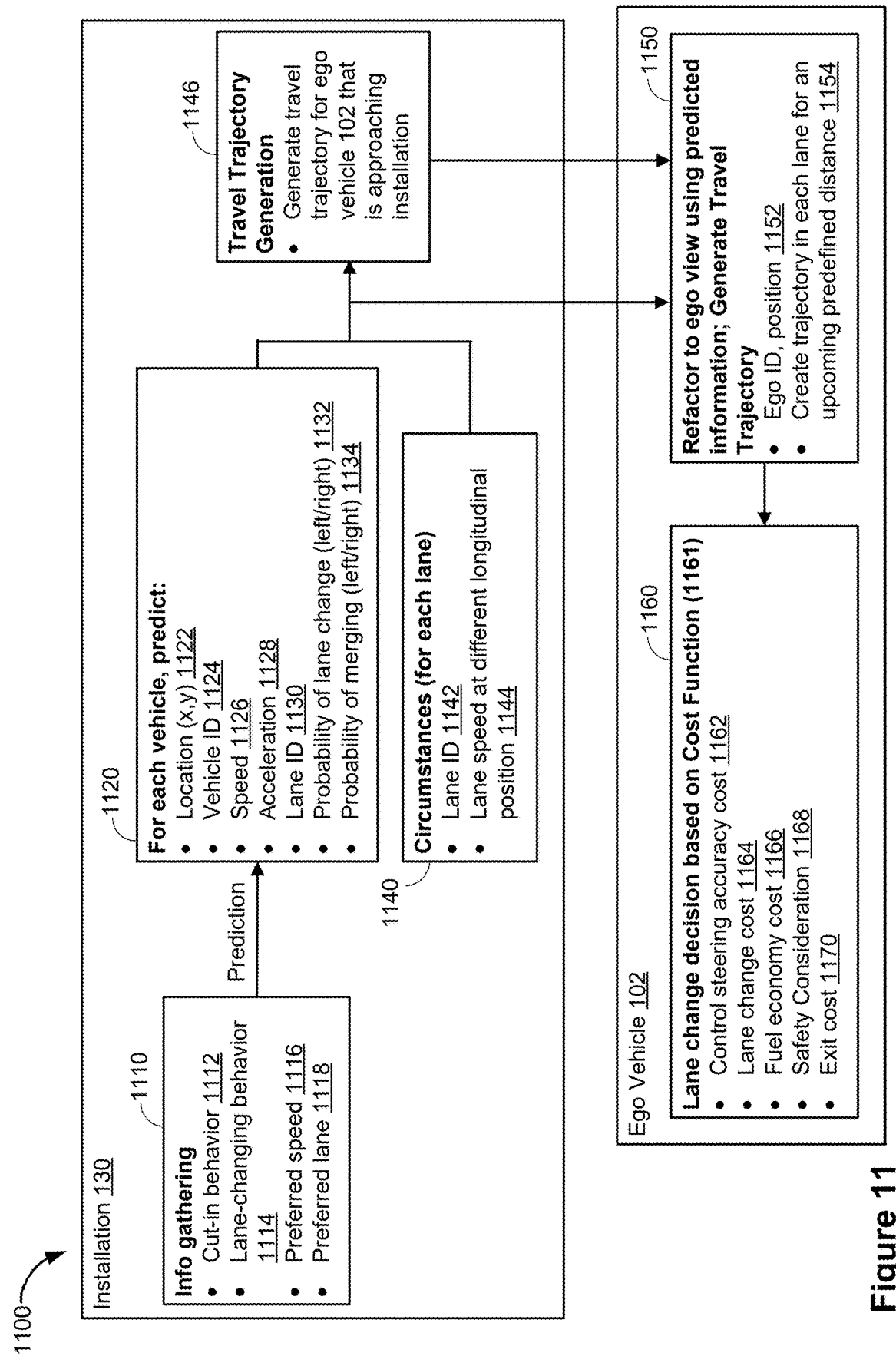
FIG. 11 illustrates an exemplary workflow for vehicle lane change decision, in accordance with some embodiments.

FIG. 11 illustrates an exemplary workflow 1100 for vehicle lane change decisions, in accordance with some embodiments.

In some embodiments, the workflow 1100 includes an information gathering step 1110 that is performed by CPU(s) 602 of an installation 130. In step 1110, the CPU(s) 602 can determine, for a respective vehicle a cut-in behavior 1112, a lane-changing behavior 1114, a preferred speed 1116, or a preferred lane of travel 1118 for a respective vehicle that is within a detection range of the sensors 660.

In some embodiments, the data gathered in step 1110 are used to generate vehicle prediction information, as illustrated in step 1120 of the workflow. In some embodiments, the vehicle prediction information includes a predicted location 1122 (e.g., (x,y) coordinates or GPS positional coordinates), a predicted vehicle ID 1124, a predicted speed 1126, a predicted acceleration 1128, a predicted lane ID 1130, a predicted probability of lane change (left/right) 1132, or a predicted probability of merging (left/right) 1134 for a respective vehicle that is outside the zone of interest, as it approaches the zone of interest.

In some embodiments, the information gathered in step 1110 is used to determine the circumstantial information (e.g., circumstances 1140) for each lane of a road that is in the zone of interest, including a lane ID 1442 and a lane speed (1144) at different longitudinal positions of the lane.

In some embodiments, the workflow 1100 includes step 1146, where the processors of the installation 130 generate a travel trajectory for an ego vehicle 102 that is approaching the installation according to the vehicle prediction information that is generated in step 1120 and the circumstantial information 1140. In some embodiments, the processors of the installation 130 transmit the travel trajectory to the ego vehicle 102, as illustrated in FIG. 11.

In some embodiments, the ego vehicle is configured to generate its own travel trajectory according to the vehicle prediction information and the circumstantial information. This is illustrated in step 1150 of the workflow 1100, where the vehicle prediction information that is generated in step 1120 and the circumstantial information 1140 are transmitted to an ego vehicle 102. In step 1150, the ego vehicle 102 takes into consideration the vehicle prediction information and the circumstantial information acquired from the sensors of the installation. In some embodiments, the circumstantial information are acquired from the perspective of the sensors of the installation and the ego vehicle 102 converts or transforms the circumstantial information from the perspective of the installation sensors to the perspective (e.g., view) of the ego vehicle. For example, the information can include an ego vehicle ID or positional information 1152. In some embodiments, the ego vehicle or the CPU(s) 602 is also configured to create trajectory in each lane for an upcoming predefined distance 1154 (e.g., the next mile or the next two miles).

In some embodiments, the workflow incudes step 1160, where the ego vehicle 102 is configured to make a lane change decision. For example, in some embodiments, the ego vehicle 102 is configured to make a lane change decision according to (e.g., by determining) a cost function 1161. In some embodiments, the cost function 1161 includes one or more terms (e.g., cost components), such as a term 1162 for control steering accuracy cost, a term 1164 for lane change cost, a term 1166 for fuel economy cost, a term 1168 for safety consideration cost, and a term 1170 for exit cost. Some embodiments implement an exit cost (e.g., a penalty) that penalizes the ego vehicle 102 when it changes lanes or moves laterally (e.g., from one lane to another lane) such that the vehicle moves away from the exit, based on the distance to the exit and the positions of other vehicles on the road.

FIGS. 12A to 12D provide a flowchart of an example process for predicting vehicle trajectory, in accordance with some embodiments. The method 1200 is performed at a computer system (e.g., computer system 600) that includes one or more first sensors (e.g., sensors 660) positioned on a fixed installation (e.g., installation 130) at a road. In some embodiments, the one or more first sensors include one or more of: a global positioning system (GPS) (e.g., GPS 662), a thermal sensor (e.g., temperature sensor) (e.g., thermal sensors 674), a light detection and ranging (LiDAR) scanner (e.g., LiDAR 664), one or more cameras (e.g., cameras 666), a radio detection and ranging (RADAR) sensor (e.g., Radar 668), an infrared sensor (e.g., infrared sensors 670), and one or more ultrasonic sensors (e.g., ultrasonic sensors 672).

In some embodiments, the computer system is physically co-located at the fixed installation and the processing is performed locally at the fixed installation. In some embodiments, the computer system is located remotely from and communicatively coupled to the fixed installation. In some embodiments, the computer system includes one or more (e.g., at least one or at least two) distinct systems located at distinct locations of the road. In one example, there may be multiple systems along the same road, each system including an installation having its own respective sensors 660 and/or processing capabilities. In another example, multiple systems may be located at different roads. For instance, a first system may be located at an on-ramp segment of a freeway and a second system may be located at a road junction; or a first system may be located at a toll booth in a first city and a second system may be located at another toll booth in a second city.

The computer system includes one or more processors (e.g., CPU(s) 602) and memory (e.g., memory 606). In some embodiments, the memory stores one or more programs or instructions configured for execution by the one or more processors. In some embodiments, the operations shown in FIGS. 1, 2, 4, 5A, 5B, 6, 7, 8, 9, 10, and 11 correspond to instructions stored in the memory or other non-transitory computer-readable storage medium. The computer-readable storage medium may include a magnetic or optical disk storage device, solid state storage devices such as Flash memory, or other non-volatile memory device or devices. In some embodiments, the instructions stored on the computer-readable storage medium include one or more of: source code, assembly language code, object code, or other instruction format that is interpreted by one or more processors. Some operations in the method 1200 may be combined with the method 1300. The order of some operations may be changed.

Referring to FIG. 12A, the computer system obtains (1202), from the one or more first sensors (e.g., sensors 660), information of a plurality of vehicles that are traveling within a zone of interest (e.g., area of interest) of a road.

In some embodiments, the zone of interest is a segment of a road where traffic may be prone to buildup, such as a freeway entrance or exit, a lane merge zone (e.g., on a section of a road where two or more lanes merge), a tunnel, a toll booth, a traffic light area, an on-ramp region of a highway, and/or a junction (e.g., an intersection) where two or more roads converge, diverge, meet or cross.

In some embodiments, the information of the plurality of vehicles includes (1204) location information (e.g., (x,y) coordinates or GPS positional information) of a respective vehicle of the plurality of vehicles. In some embodiments, the information of the plurality of vehicles includes (1206) a speed (e.g., average speed) of the respective vehicle. In some embodiments, the information of the plurality of vehicles includes (1208) an acceleration (e.g., average acceleration) of the respective vehicle. In some embodiments, the information of the plurality of vehicles includes a lane ID associated with a lane of travel of a respective vehicle, a lane change behavior of a respective vehicle, or a lane merging behavior of a respective vehicle. This is illustrated in FIG. 10.

In some embodiments, the one or more first sensors include (1210) one or more light detection and ranging (LiDAR) scanners, one or more cameras, or a radio detection and ranging (RADAR) sensor.

In some embodiments, the zone of interest of the road comprises (1212) an intersection of the road (e.g., signaled or unsignaled).

In some embodiments, the zone of interest comprises (1214) a merging zone on the road (e.g., lane merging area of the road).

In some embodiments, the computer system receives (1216) vehicle status information from at least a subset (e.g., one or more) of the plurality of vehicles that are traveling within the zone of interest. In some embodiments, the computer system receives vehicle status information via a wireless communication, such as 3G/4G/5G communication.

Figure 12B:
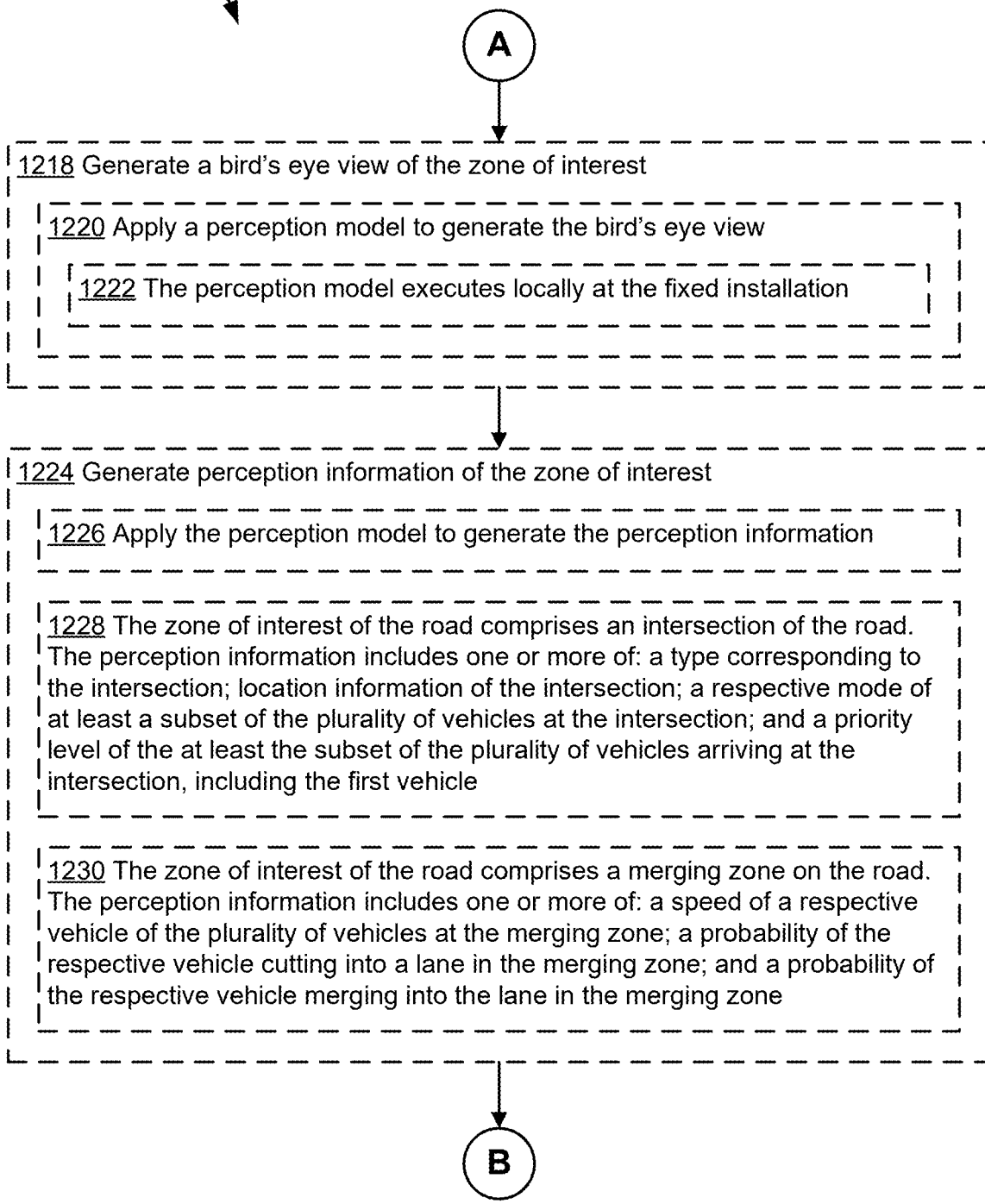

Referring to FIG. 12B, in some embodiments, the computer system generates (1218) a bird's eye view of the zone of interest. In some embodiments, the computer system applies (1220) a data-driven perception model (e.g., machine learning models 632) to generate the bird's eye view. In some embodiments, the perception model executes (1222) locally at the fixed installation. In some embodiments, the perception model executes on the cloud (e.g., on server 104, as machine learning models 250).

In some embodiments, the computer system generates (1224) perception information of the zone of interest. In some embodiments, the computer system generates the perception information by applying (1226) the perception model.

In some embodiments, the zone of interest of the road comprises an intersection of the road. The perception information includes (1228) one or more of: a type corresponding to the intersection (e.g., type 802) (e.g., signaled intersection, or a priority level intersection (e.g., which vehicles approach an intersection first for a four-way stop sign); location information of the intersection (e.g., location 804); a respective mode of at least a subset of the plurality of vehicles at the intersection (e.g., mode 820) (e.g., stop, creep, or fast-go); and a priority level of the at least the subset of the plurality of vehicles arriving at the intersection, including the first vehicle. This is illustrated in FIG. 8.

In some embodiments, the zone of interest of the road comprises a merging zone on the road. The perception information includes (1230) one or more of: a speed of a respective vehicle of the plurality of vehicles at the merging zone, a probability of the respective vehicle cutting into a lane in the merging zone (e.g., cut-in probability 932) (e.g., where a merging vehicle cuts off another driver, or does not yield to all other traffic), and a probability of the respective vehicle merging into the lane in the merging zone (merging probability 934).

Figure 12C:
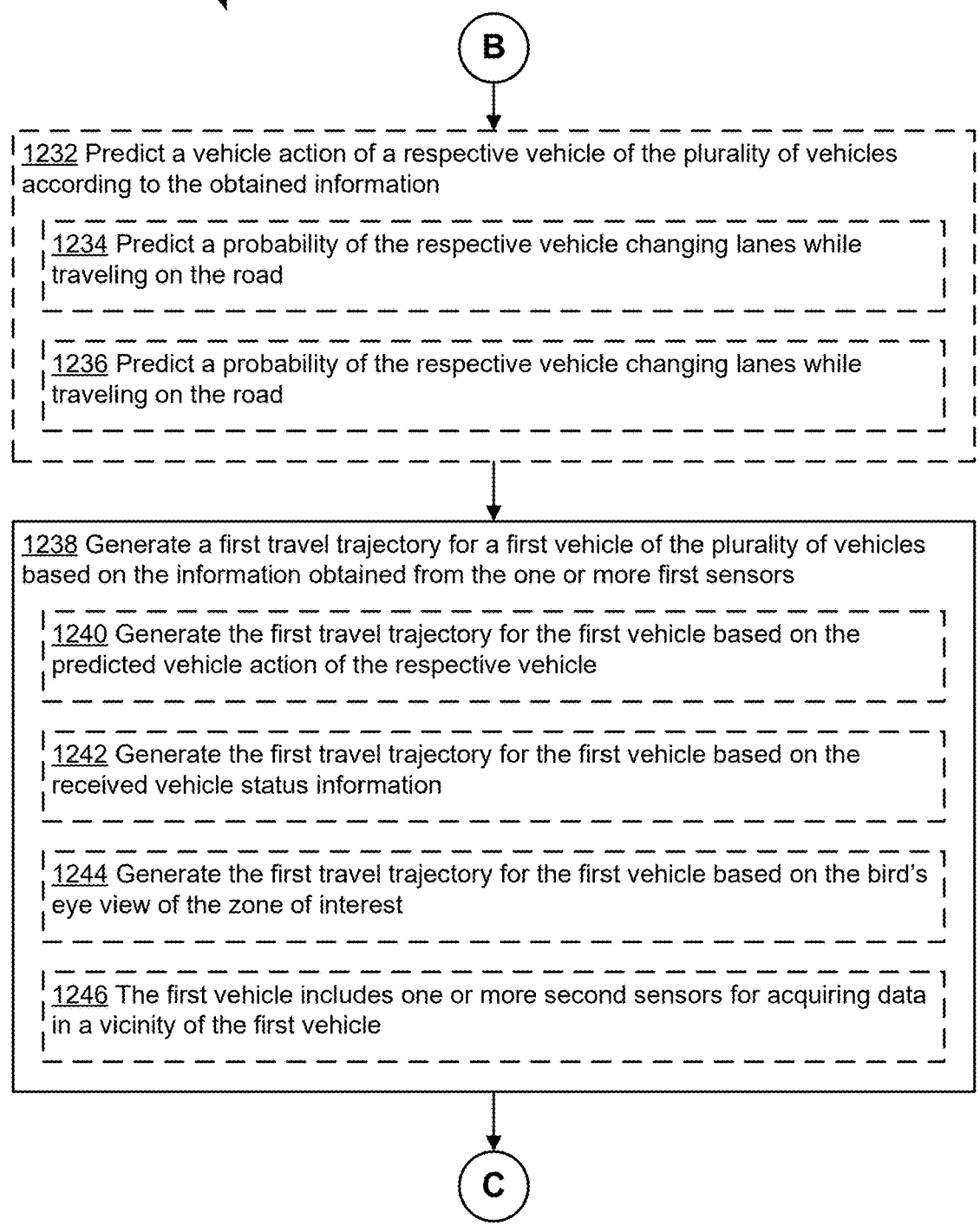

Referring to FIG. 12C, in some embodiments, the computer system predicts (1232) a vehicle action of a respective vehicle of the plurality of vehicles according to the obtained information. In some embodiments, predicting the vehicle action of the respective vehicle includes predicting (1234) a probability of the respective vehicle changing lanes while traveling on the road. In some embodiments, predicting the vehicle action of the respective vehicle includes predicting (1236) a probability of the respective vehicle changing lanes while traveling on the road.

The computer system generates (1238) a first travel trajectory for a first vehicle of the plurality of vehicles based on at least the information obtained from the one or more first sensors. In some embodiments, the information obtained by the one or more first sensors of the computer system is information that is beyond a sensing range of the first vehicle. In some embodiments, the one or more first sensors of the fixed installation can monitor the zone of interest continuously. For example, the one or more first sensors can gather the information of the vehicles at regular intervals such as every 0.1 second, every 1 second, or every 2 seconds. In some embodiments, the zone of interest is an area on the road that is within a detection range of the one or more sensors.

In some embodiments, the generating of the first travel trajectory for the first vehicle is (1240) further based on the predicted vehicle action.

In some embodiments, the generating of the first travel trajectory for the first vehicle is (1242) further based on the received vehicle status information.

In some embodiments, the generating of the first travel trajectory for the first vehicle is (1244) further based on the bird's eye view of the zone of interest. For example, in some embodiments, the bird's eye view can advantageously provide an accurate view of obstacle locations that are not in direct sight of the first vehicle. These accurate positioning can be used for better prediction of obstacle behavior.

In some embodiments, the first vehicle includes (1246) one or more second sensors (e.g., sensors 260) for acquiring data in a vicinity of the first vehicle.

With continued reference to FIG. 12D, the computer system sends (1248), to the first vehicle, the first travel trajectory such that the first vehicle is configured to at least partially autonomously drive the first vehicle based on the first travel trajectory of the first vehicle. In some embodiments, the first travel trajectory specifies a speed of travel, an acceleration, a speed limit, a desired distance between first vehicle and a vehicle ahead of the first vehicle, or a desired distance between the first vehicle and a vehicle behind the first vehicle.

In some embodiments, the computer system sends (1250), to the first vehicle, the bird's eye view of the zone of interest. The first vehicle is configured to apply the first travel trajectory in combination with the bird's eye view of the zone of interest.

In some embodiments, the computer system sends (1252), to the first vehicle, perception information of the intersection of the road generated by the computer system. The first vehicle is configured to apply the first travel trajectory in combination with the perception information.

In some embodiments, the computer system sends (1254), to the first vehicle, perception information of the merging zone generated by the computer system. The first vehicle is configured to apply the first travel trajectory in combination with the perception information.

In some embodiments, the first vehicle is (1256) configured to apply the first travel trajectory in combination with the data acquired by the one or more second sensors (e.g., sensors 260).

In some embodiments, the first vehicle is (1258) configured to abort executing the first travel trajectory in accordance with a determination that the first vehicle cannot execute the first travel trajectory.

In some embodiments, the computer system controls (1260) (e.g., commands or causes) the first vehicle to at least partially autonomously drive the first vehicle to track the first travel trajectory.

Figure 13B:
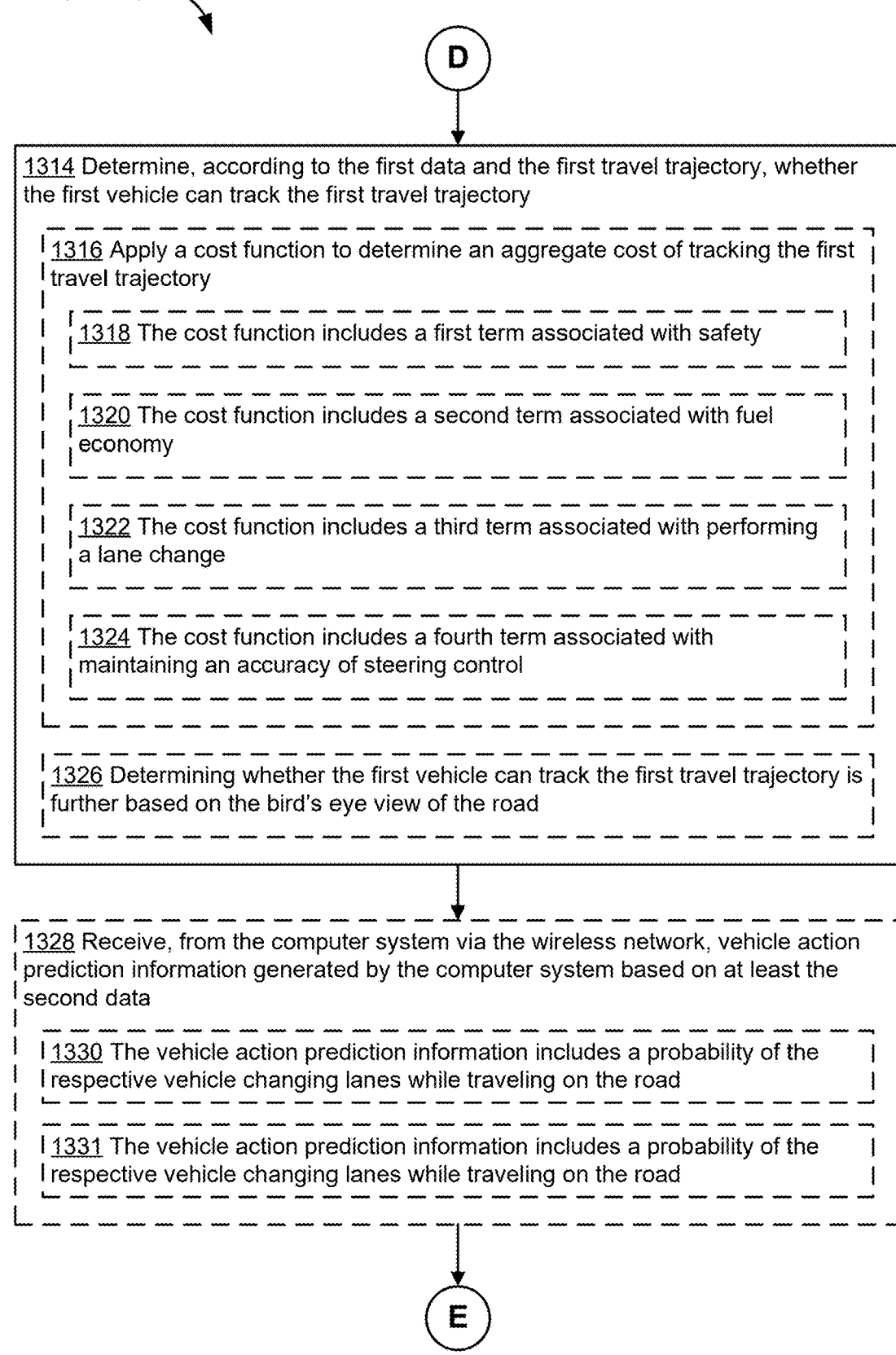

FIGS. 13A to 13C provide a flowchart of an example process for controlling a vehicle trajectory, in accordance with some embodiments. The method 1300 is performed at a first vehicle (e.g., ego vehicle) (e.g., vehicle 102) traveling along a road (e.g., road 762).

The first vehicle includes at least a first sensor (e.g., sensors 260), one or more processors (e.g., CPU(s) 202), and memory (e.g., memory 206). In some embodiments, the operations shown in FIGS. 1, 2, 4, 5A, 5B, 6, 7, 8, 9, 10, 11, and 12A-12D correspond to instructions stored in the memory or other non-transitory computer-readable storage medium. The computer-readable storage medium may include a magnetic or optical disk storage device, solid state storage devices such as Flash memory, or other non-volatile memory device or devices. In some embodiments, the instructions stored on the computer-readable storage medium include one or more of: source code, assembly language code, object code, or other instruction format that is interpreted by one or more processors. Some operations in the method 1300 may be combined with the method 1200. The order of some operations may be changed.

Referring to FIG. 13A, the first vehicle acquires (1302), from the at least the first sensor, first data of one or more first objects in a vicinity of the first vehicle. For example, in some embodiments, the one or more first objects in the vicinity of the vehicle include other vehicles that are traveling on the road. In some embodiments, the one or more first objects in the vicinity of the vehicle include non-vehicle road obstacles that are intentionally placed on the road (e.g., cones or roadblocks due to road construction) or objects that are unintentionally misplaced on the road (e.g., objects that have fallen off a vehicle).

The first vehicle receives (1304), from a computer system (e.g., computer system 600) associated with a fixed installation (e.g., installation 130), via a wireless network, a first travel trajectory for the first vehicle. The first travel trajectory is generated by the computer system based on second data corresponding to one or more second objects sensed on the road by sensors (e.g., sensors 660) of the fixed installation. For example, in some embodiments, the first vehicle receives from the computer system the first travel trajectory when the first vehicle enters a zone of interest of the fixed installation. Examples of zones of interest include a segment of a road, a freeway entrance or exit, a lane merge zone, a tunnel, a toll booth, a traffic light area, an on-ramp region of a highway, and a junction or an intersection where two or more roads converge, diverge, meet or cross. In some embodiments, the fixed installation utilizes sensors to gather information in the zone of interest. In some embodiments, the fixed installation gathers information from road vehicles through bidirectional vehicle-to-infrastructure (V2I) communication or bidirectional vehicle-to-everything (V2X) communications. In some embodiments, the V2I communication or V2X communication is implemented using a wireless internet (e.g., cellular) communication network, such as a 3G, 4G, or 5G network. In some embodiments, the computer system generates scene perception and prediction information, as well as planning suggestions, and provides them to vehicles in the zone of interest as a service through the V2X or V2I communication.

In some embodiments, the one or more second objects include (1306) one or more vehicles that are traveling on the road with the first vehicle.

In some embodiments, the second data includes (1308) one or more of: location information (e.g., (x,y) coordinates) of a respective vehicle of the one or more vehicles, a speed (e.g., average speed) of the respective vehicle, and an acceleration (e.g., an average acceleration, a maximum acceleration, or a minimum deceleration) of the respective vehicle.

In some embodiments, the sensors of the fixed installation include (1310) at least one of: a light detection and ranging (LiDAR) scanner (e.g., LiDAR 664), a camera (e.g., cameras 666), or a radio detection and ranging (RADAR) sensor (e.g., Radar 668).

In some embodiments, the first vehicle receives (1312), from the computer system, a bird's eye view of the road.

Referring to FIG. 13B, the first vehicle determines (1314), according to the first data and the first travel trajectory, whether the first vehicle can track (e.g., follow) the first travel trajectory.

In some embodiments, the first vehicle applies (1316) a cost function (e.g., cost function 1161) to determine an aggregate cost (e.g., a value) of tracking the first travel trajectory, to determine whether it can track the first trajectory. In some embodiments, the cost function includes (1318) a first term associated with safety (e.g., term 1168). For example, in some embodiments, the first term associated with safety has a value that is determined according to factors such as whether there are other vehicles coming at high speed from the back of the first vehicle, or whether the first vehicle may not be able to do a lane change due to traffic conditions. In some embodiments, the cost function includes (1320) a second term associated with fuel economy (e.g., term 1166). In some embodiments, the cost function includes (1322) a third term (e.g., term 1164) associated with performing a lane change. In some embodiments, the cost function includes (1324) a fourth term (e.g., term 1162) associated with maintaining an accuracy of steering control.

In some embodiments, the determining whether the first vehicle can track the first travel trajectory is (1326) further based on the bird's eye view of the road.

In some embodiments, the first vehicle receives (1328) from the computer system via the wireless network, vehicle action prediction information generated by the computer system based on at least the second data. In some embodiments, the vehicle action prediction information includes (1330) a probability of the respective vehicle changing lanes while traveling on the road. In some embodiments, the vehicle action prediction information includes (1331) a probability of the respective vehicle changing lanes while traveling on the road.

With continued reference to FIG. 13C, the first vehicle, in accordance with a determination that it can track the first travel trajectory, at least partially autonomously drives (1332) the first vehicle in the first travel trajectory.

In some embodiments, the first vehicle at least partially autonomously drives the first vehicle in the first travel trajectory by adjusting (1334) one or more parameters of a steering control model of the first vehicle. For example, in some embodiments, the parameters of the steering control model are configured to enable the first vehicle to at least partially autonomously drive itself in a tracking-based mode or a stability-based mode. In some embodiments, the tracking-based mode is configured to maintain the lateral offset (e.g., an offset from the center of a lane that the vehicle is traveling) to as close to zero as possible and force the first vehicle to stay in the middle of its lane to keep its distance from other vehicles in neighboring lanes. In some embodiments, the stability-based mode is configured to permit the first vehicle to deviate from the middle of its lane in order to provide a smoother ride. Additional details pertaining to at least partially autonomously driving a vehicle in a tracking-based mode or a stability-based mode are described in U.S. patent application Ser. No. 18/912,574, which is incorporated by reference herein in its entirety.

In some embodiments, the first vehicle, in accordance with a determination (1336) that the first vehicle cannot track the first travel trajectory, rejects the first travel trajectory and controls the first vehicle to at least partially autonomously drive the first vehicle according to a second travel trajectory that is different from the first travel trajectory.

In some embodiments, at least partially autonomously driving the first vehicle according to the second travel trajectory includes switching (1338) from a first lane of the road to a second lane of the road.

Turning on to some example embodiments:

(A1) In accordance with some embodiments, a method for predicting vehicle trajectory is performed at a computer system associated with a fixed installation having one or more first sensors. The computer system includes one or more processors and memory. The method includes (i) obtaining, from the one or more first sensors, information of a plurality of vehicles that are traveling within a zone of interest of a road; (ii) generating a first travel trajectory for a first vehicle of the plurality of vehicles based on the information obtained from the one or more first sensors; and (iii) sending, to the first vehicle, the first travel trajectory such that the first vehicle is configured to at least partially autonomously drive the first vehicle based on the first travel trajectory of the first vehicle.

(A2) In some embodiments of A1, the information of the plurality of vehicles includes one of more of: (i) location information of a respective vehicle of the plurality of vehicles; (ii) a speed of the respective vehicle; and (iii) an acceleration of the respective vehicle.

(A3) In some embodiments of A1 or A2, the method includes predicting a vehicle action of a respective vehicle of the plurality of vehicles according to the obtained information. Generating the first travel trajectory for the first vehicle is further based on the predicted vehicle action.

(A4) In some embodiments of A3, predicting the vehicle action of the respective vehicle includes predicting (i) a probability of the respective vehicle changing lanes while traveling on the road or (ii) a probability of the respective vehicle changing lanes while traveling on the road.

(A5) In some embodiments of any of A1-A4, the method includes receiving vehicle status information from at least a subset of the plurality of vehicles that are traveling within the zone of interest. Generating the first travel trajectory for the first vehicle is further based on the received vehicle status information.

(A6) In some embodiments of any of A1-A5, the one or more first sensors include: one or more light detection and ranging (LiDAR) scanners, one or more cameras, or a radio detection and ranging (RADAR) sensor.

(A7) In some embodiments of any of A1-A6, the method further includes generating, by applying a perception model, a bird's eye view of the zone of interest.

(A8) In some embodiments of A7, generating the first travel trajectory for the first vehicle is further based on the bird's eye view of the zone of interest.

(A9) In some embodiments of A7 or A8, the method includes sending, to the first vehicle, the bird's eye view of the zone of interest. The first vehicle is configured to apply the first travel trajectory in combination with the bird's eye view of the zone of interest.

(A10) In some embodiments of any of A7-A9, the perception model is executed locally at the fixed installation.

(A11) In some embodiments of any of A1-A10, the zone of interest of the road comprises an intersection of the road. The method further includes sending, to the first vehicle, perception information of the intersection of the road generated by the computer system. The first vehicle is configured to apply the first travel trajectory in combination with the perception information.

(A12) In some embodiments of A11, generating the perception information by applying a perception model, the perception information including one or more of: (i) a type corresponding to the intersection; (ii) location information of the intersection; (iii) a respective mode of at least a subset of the plurality of vehicles at the intersection; and (iv) a priority level of the at least the subset of the plurality of vehicles arriving at the intersection, including the first vehicle.

(A13) In some embodiments of any of A1-A12, the zone of interest comprises a merging zone on the road. The method includes sending, to the first vehicle, perception information of the merging zone generated by the computer system. The first vehicle is configured to apply the first travel trajectory in combination with the perception information.

(A14) In some embodiments of A13, the method further includes generating the perception information by applying a perception model. The perception information includes one or more of: (i) a speed of a respective vehicle of the plurality of vehicles at the merging zone; (ii) a probability of the respective vehicle cutting into a lane in the merging zone; and (iii) a probability of the respective vehicle merging into the lane in the merging zone.

(A15) In some embodiments of any of A1-A14, the first vehicle includes one or more second sensors for acquiring data in a vicinity of the first vehicle. The first vehicle is configured to apply the first travel trajectory in combination with the data acquired by the one or more second sensors.

(A16) In some embodiments of any of A1-A15, the method further includes controlling the first vehicle to at least partially autonomously drive the first vehicle to track the first travel trajectory.

(A17) In some embodiments of any of A1-A16, the first vehicle is configured to abort executing the first travel trajectory in accordance with a determination that the first vehicle cannot execute the first travel trajectory.

(B1) In accordance with some embodiments, a computer system is associated with a fixed installation having one or first more sensors. The computer system comprises one or more processors and memory coupled to the one or more processors. The memory stores instructions that, when executed by the one or more processors, cause the computer system to perform the method of any of A1-A17.

(C1) In accordance with some embodiments, a non-transitory computer-readable storage medium stores instructions that, when executed by one or more processors of computer system that is associated with a fixed installation having one or first more sensors, cause the computer system to perform the method of any of A1-A17.

(D1) In accordance with some embodiments, a method for controlling a vehicle trajectory is performed at a first vehicle traveling along a road. The first vehicle includes at least a first sensor, one or more processors, and memory. The method includes (i) acquiring, from the at least the first sensor, first data of one or more first objects in a vicinity of the first vehicle; (ii) receiving, from a computer system associated with a fixed installation, via a wireless network, a first travel trajectory for the first vehicle, where the first travel trajectory is generated by the computer system based on second data corresponding to one or more second objects sensed on the road by sensors of the fixed installation; (iii) determining (e.g., by the first vehicle), according to the first data and the first travel trajectory, whether the first vehicle can track the first travel trajectory; and (iv) in accordance with a determination that the first vehicle can track the first travel trajectory, at least partially autonomously drive the first vehicle in the first travel trajectory.

(D2) In some embodiments of D1, determining whether the first vehicle can track the first travel trajectory includes applying a cost function to determine an aggregate cost of tracking the first travel trajectory.

(D3) In some embodiments of D2, the cost function includes at least two of: (i) a first term associated with safety; (ii) a third term associated with fuel economy; (iii) a second term associated with performing a lane change; and (iv) a fourth term associated with maintaining an accuracy of steering control.

(D4) In some embodiments of any of D1-D3, at least partially autonomously drive the first vehicle in the first travel trajectory includes adjusting one or more parameters of a steering control model of the first vehicle.

(D5) In some embodiments of any of D1-D4, the method includes, in accordance with a determination that the first vehicle cannot track the first travel trajectory: (i) rejecting the first travel trajectory; and (ii) controlling the first vehicle to at least partially autonomously drive the first vehicle according to a second travel trajectory that is different from the first travel trajectory.

(D6) In some embodiments of D5, at least partially autonomously driving the first vehicle according to the second travel trajectory includes switching from a first lane of the road to a second lane of the road.

(D7) In some embodiments of any of D1-D6, the one or more second objects include one or more vehicles that are traveling on the road with the first vehicle.

(D8) In some embodiments of D7, the second data includes one or more of: (i) location information of a respective vehicle of the one or more vehicles; (ii) a speed of the respective vehicle; and (iii) an acceleration of the respective vehicle.

(D9) In some embodiments of any of D1-D8, the method further includes receiving, from the computer system via the wireless network, vehicle action prediction information generated by the computer system based on at least the second data.

(D10) In some embodiments of D9, the vehicle action prediction information includes (i) a probability of the respective vehicle changing lanes while traveling on the road; or (ii) a probability of the respective vehicle changing lanes while traveling on the road.

(D11) In some embodiments of any of D1-D10, the sensors of the fixed installation include at least one of: a light detection and ranging (LiDAR) scanner, a camera, or a radio detection and ranging (RADAR) sensor.

(D12) In some embodiments of any of D1-D11, the method further includes receiving, from the computer system, a bird's eye view of the road. Determining whether the first vehicle can track the first travel trajectory is further based on the bird's eye view of the road.

(E1) In accordance with some embodiments, a first vehicle includes at least a first sensor, a vehicle control system, one or more processors, and memory. The memory stores one or more programs configured for execution by the one or more processors, the one or more programs include instructions for performing the method of any of D1-D12.

(F1) In accordance with some embodiments, a computer-readable storage medium stores instructions that, when executed by one or more processors of a first vehicle includes at least a first sensor and a vehicle control system, cause the first vehicle to perform the method of any of D1-D12.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

As used herein, the phrase "based on" does not mean "based only on," unless expressly specified otherwise. In other words, the phrase "based on" describes both "based only on" and "based at least on."

As used herein, the term "exemplary" means "serving as an example, instance, or illustration," and does not necessarily indicate any preference or superiority of the example over any other configurations or implementations.

As used herein, the term "and/or" encompasses any combination of listed elements. For example, "A, B, and/or C" includes the following sets of elements: A only, B only, Conly, A and B without C, A and C without B, B and C without A, and a combination of all three elements, A, B, and C.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for predicting vehicle trajectory, comprising:
at a computer system associated with a fixed installation situated at a stationary position along a road and having one or more first sensors, the computer system including one or more processors and memory:
obtaining, from the one or more first sensors, information of a plurality of vehicles that are traveling within a zone of interest of the road;
determining, for a respective vehicle of the plurality of vehicles, a probability of the respective vehicle changing lanes within a predefined time period;
generating a first travel trajectory for a first vehicle of the plurality of vehicles based on the information obtained from the one or more first sensors and the determined probability for the respective vehicle; and
sending, to the first vehicle, the first travel trajectory such that the first vehicle is configured to at least partially autonomously drive the first vehicle based on the first travel trajectory of the first vehicle.

2. The method of claim 1, wherein the information of the plurality of vehicles includes one of more of:
location information of a respective vehicle of the plurality of vehicles;
a speed of the respective vehicle; and
an acceleration of the respective vehicle.

3. The method of claim 1, further comprising:
predicting a vehicle action of a respective vehicle of the plurality of vehicles according to the obtained information,
wherein generating the first travel trajectory for the first vehicle is further based on the predicted vehicle action.

4. The method of claim 1, further comprising:
receiving vehicle status information from at least a subset of the plurality of vehicles that are traveling within the zone of interest,
wherein generating the first travel trajectory for the first vehicle is further based on the received vehicle status information.

5. The method of claim 1, wherein:
the first vehicle includes one or more second sensors for acquiring data in a vicinity of the first vehicle; and
the first vehicle is configured to apply the first travel trajectory in combination with the data acquired by the one or more second sensors.

6. The method of claim 1, further comprising:
controlling the first vehicle to at least partially autonomously drive the first vehicle to track the first travel trajectory.

7. The method of claim 1, wherein the first vehicle is configured to abort executing the first travel trajectory in accordance with a determination that the first vehicle cannot execute the first travel trajectory.

8. A computer system associated with a fixed installation situated at a stationary position along a road and having one or first more sensors, the computer system comprising:
one or more processors; and
memory coupled to the one or more processors, the memory storing one or more programs configured for execution by the one or more processors, the one or more programs including instructions for:
obtaining, from the one or more first sensors, information of a plurality of vehicles that are traveling within a zone of interest of the road;
determining, for a respective vehicle of the plurality of vehicles, a probability of the respective vehicle changing lanes within a predefined time period;
generating a first travel trajectory for a first vehicle of the plurality of vehicles based on the information obtained from the one or more first sensors and the determined probability for the respective vehicle; and
sending, to the first vehicle, the first travel trajectory such that the first vehicle is configured to at least partially autonomously drive the first vehicle based on the first travel trajectory of the first vehicle.

9. The computer system of claim 8, wherein the one or more first sensors include: one or more light detection and ranging (LiDAR) scanners, one or more cameras, or a radio detection and ranging (RADAR) sensor.

10. The computer system of claim 8, the one or more programs further including instructions for:
generating an aerial view of the zone of interest.

11. The computer system of claim 10, wherein the instructions for generating the first travel trajectory for the first vehicle include instructions for generating the first travel trajectory further based on the aerial view of the zone of interest.

12. The computer system of claim 10, the one or more programs further including instructions for:
sending, to the first vehicle, the aerial view of the zone of interest,
wherein the first vehicle is configured to apply the first travel trajectory in combination with the aerial view of the zone of interest.

13. The computer system of claim 10, wherein the perception model executes locally at the fixed installation.

14. The computer system of claim 10, wherein the instructions for generating the aerial view of the zone of interest include instructions for applying a perception model to generate the aerial view of the zone of interest.

15. The computer system of claim 8, the one or more programs further including instructions for:
receiving vehicle status information from at least a subset of the plurality of vehicles that are traveling within the zone of interest,
wherein generating the first travel trajectory for the first vehicle is further based on the received vehicle status information.

16. A non-transitory computer-readable storage medium storing one or more programs configured for execution by one or more processors of a computer system that is associated with a fixed installation situated at a stationary position along a road and having one or first more sensors, the one or more programs comprising instructions for:
obtaining, from the one or more first sensors, information of a plurality of vehicles that are traveling within a zone of interest of the road;
determining, for a respective vehicle of the plurality of vehicles, a probability of the respective vehicle changing lanes within a predefined time period;
generating a first travel trajectory for a first vehicle of the plurality of vehicles based on the information obtained from the one or more first sensors and the determined probability for the respective vehicle; and
sending, to the first vehicle, the first travel trajectory such that the first vehicle is configured to at least partially autonomously drive the first vehicle based on the first travel trajectory of the first vehicle.

17. The non-transitory computer-readable storage medium of claim 16, wherein:

the zone of interest of the road comprises an intersection of the road; and the one or more programs further include instructions for:

sending, to the first vehicle, perception information of the intersection of the road generated by the computer system, wherein the first vehicle is configured to apply the first travel trajectory in combination with the perception information.

18. The non-transitory computer-readable storage medium of claim 17, the one or more programs further comprising instructions for:

generating the perception information by applying a perception model, the perception information including one or more of:
 a type corresponding to the intersection;
 location information of the intersection;
 a respective mode of at least a subset of the plurality of vehicles at the intersection; and
 a priority level of the at least the subset of the plurality of vehicles arriving at the intersection, including the first vehicle.

19. The non-transitory computer-readable storage medium of claim 16, wherein:

the zone of interest comprises a merging zone on the road;

the one or more programs include instructions for sending, to the first vehicle, perception information of the merging zone generated by the computer system; and the first vehicle is configured to apply the first travel trajectory in combination with the perception information.

20. The non-transitory computer-readable storage medium of claim 19, the one or more programs further comprising instructions for:

generating the perception information by applying a perception model, the perception information including one or more of:
 a speed of a respective vehicle of the plurality of vehicles at the merging zone;
 a probability of the respective vehicle cutting into a lane in the merging zone; and
 a probability of the respective vehicle merging into the lane in the merging zone.

* * * * *